(12) United States Patent
Hardin et al.

(10) Patent No.: US 11,622,281 B2
(45) Date of Patent: Apr. 4, 2023

(54) RADIO FREQUENCY COEXISTENCE MITIGATIONS WITHIN WIRELESS USER EQUIPMENT HANDSETS

(71) Applicant: QUALCOMM Incorporated, San Diego, CA (US)

(72) Inventors: Carl Hardin, Encinitas, CA (US); Brian Clarke Banister, San Diego, CA (US); Shrenik Patel, San Diego, CA (US); Michael Kohlmann, San Francisco, CA (US); Liang Zhao, Saratoga, CA (US); Le Nguyen Luong, San Diego, CA (US); Tevfik Yucek, San Jose, CA (US); Roland Rick, Winter Park, CO (US); Shriram Gurumoorthy, Denver, CO (US); Francis Ngai, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 17/171,915

(22) Filed: Feb. 9, 2021

(65) Prior Publication Data
US 2021/0250775 A1 Aug. 12, 2021

Related U.S. Application Data

(60) Provisional application No. 62/972,597, filed on Feb. 10, 2020.

(51) Int. Cl.
*H04W 4/00* (2018.01)
*H04W 16/14* (2009.01)
(Continued)

(52) U.S. Cl.
CPC ............ *H04W 16/14* (2013.01); *H04W 4/80* (2018.02); *H04W 52/243* (2013.01); *H04W 52/367* (2013.01)

(58) Field of Classification Search
CPC ... H04W 28/04; H04W 72/04; H04W 72/042; H04W 88/08; H04W 16/14; H04W 4/80;
(Continued)

(56) References Cited

U.S. PATENT DOCUMENTS 9,755,730 B2 * 9/2017 Ryu .................. H04B 7/18517
2004/0181321 A1 * 9/2004 Fries ...................... B61L 1/187
701/19

(Continued)

*Primary Examiner* — Phuongchau Ba Nguyen
(74) *Attorney, Agent, or Firm* — Loza & Loza, LLP

(57) ABSTRACT

A user equipment (UE) includes a first communication component configured to use a first frequency band, such as ultra-wide band (UWB), and a second communication component configured to use an intermediate frequency (IF) band that overlaps with the UWB band, such as an IF millimeter wave (mmWave) band. The second communication component conducts an IF signal along an internal signal conduction line that may interfere with UWB processing. A processor of the UE is configured to detect an indication of such interference, and, in response to the indication of interference, control the second communication component to adjust a characteristic of the IF band signal to mitigate the interference, such as by reducing its signal strength. The amount by which the IF band signal strength is reduced may be controlled to achieve a desired tradeoff between various performance metrics, such as power consumption and quality of service.

30 Claims, 25 Drawing Sheets

(51) Int. Cl.
*H04W 52/24* (2009.01)
*H04W 52/36* (2009.01)
*H04W 4/80* (2018.01)

(58) Field of Classification Search
CPC ............. H04W 52/243; H04W 52/367; H04W 52/241; H04W 72/0453; H04W 72/082; H04L 5/0007; H04B 17/345
See application file for complete search history.

(56) References Cited

U.S. PATENT DOCUMENTS

| | | | | |
|---|---|---|---|---|
| 2006/0038734 | A1* | 2/2006 | Shtrom | H01Q 21/062 343/700 MS |
| 2011/0026418 | A1* | 2/2011 | Bollea | H01Q 1/2258 370/252 |
| 2012/0098730 | A1* | 4/2012 | Kish | H01Q 21/205 343/876 |
| 2014/0319285 | A1* | 10/2014 | Hogan | B61L 29/226 246/122 R |
| 2015/0124890 | A1* | 5/2015 | Huang | H04B 3/56 375/257 |
| 2015/0372395 | A1* | 12/2015 | Lavedas | G01R 33/3642 343/855 |
| 2020/0371179 | A1* | 11/2020 | Zhang | G01R 33/34 |
| 2021/0341550 | A1* | 11/2021 | Wei | G01R 31/67 |

* cited by examiner

2000

2002 — In a user equipment (UE) for wireless communication that includes a first communication component configured for use with a first frequency band and a second communication component configured for use with a second frequency band that overlaps with the first frequency band, the second communication component radiating at least some signals at the second frequency band internally within the UE: detect interference between the signals radiated internally within the UE at the second frequency and the first communication component of the UE 2004 — Control one or more of the first communication component and the second communication component to mitigate the interference

Processor of User Equipment (UE) 2200

| Column 1 | Column 2 | Column 3 | Column 4 |
|---|---|---|---|
| UWB signal generation controller 2202 | | | Noise floor detection controller 2250 |
| UWB received signal processing controller 2204 | RAT UL signal generation controller 2214 | Temperature-based mitigation controller 2238 | Noise floor-based mitigation controller 2252 |
| IF mmWave UL signal generation controller 2206 | RAT DL signal processing controller 2216 | IF mmWave UL amplifier gain controller 2226 | Freq. band disabling mitigation controller 2254 |
| IF mmWave DL signal processing controller 2208 | UWB signal de-sense/interference detection controller 2218 | IF mmWave UL duty cycle controller 2228 | Adaptive (run-time) interference mitigation controller 2240 |
| WLAN signal generation controller 2210 | IF mmWave interference mitigation controller 2220 | IF mmWave UL controller to reduce UWB de-sense to target amount 2230 | Native metric-based adaptive mitigation controller 2242 |
| WLAN received signal processing controller 2212 | IF mmWave UL signal switchpoint controller or IF shift controller 2222 | IF mmWave UL co-existence latency controller 2232 | LBT-based mitigation controller 2256 |
| RACH exemption mitigation controller 2262 | IF mmWave UL DAC controller 2224 | Transceiver pair-based mitigation controller 2234 | QoS, RSSI, or SINR detector 2244 |
| | Adjacent channel-based mitigation controller 2264 | Folded-state mitigation controller 2236 | UWB victim-based mitigation controller 2246 |
| | LIF-based mitigation controller 2266 | | Viable freq. prioritization controller 2258 |
| | | LIC-based mitigation controller 2268 | mmWave victim-based mitigation controller 2248 |
| | | | Viable freq. database query controller 2260 |
| | | | UWB feedback-based mitigation optimization controller 2270 |

RADIO FREQUENCY COEXISTENCE MITIGATIONS WITHIN WIRELESS USER EQUIPMENT HANDSETS

CROSS-REFERENCE TO RELATED APPLICATIONS

This application claims priority based on U.S. Provisional Patent Application Ser. No. 62/972,597, filed Feb. 10, 2020, for "RADIO FREQUENCY COEXISTENCE MITIGATIONS WITHIN WIRELESS USER EQUIPMENT HANDSETS," which is assigned to the assignee hereof and incorporated by reference herein in its entirety.

FIELD OF THE DISCLOSURE

The technology discussed herein relates generally to wireless communication systems, and more particularly, to radio frequency coexistence mitigations within wireless communication devices such as user equipment (UE) handsets.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. A new telecommunication standard is 5G New Radio (NR). 5G NR is part of a mobile broadband evolution promulgated by Third Generation Partnership Project (3GPP) to meet new requirements associated with latency, reliability, security, scalability (e.g., with Internet of Things (IoT)), and other requirements. It would be desirable to provide improvements in such devices. Such improvements may also be applicable to other wireless devices and to other multi-access technologies and the telecommunication standards that employ such technologies.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the present disclosure provides a user equipment (UE) for wireless communication. The UE includes: a first communication component configured to use a first frequency band; a second communication component configured to use an intermediate frequency band to conduct a signal along a signal conduction line within the UE, the intermediate frequency band overlapping with the first frequency band; and a processor. The processor is configured to: detect an indication of interference to the first communication component caused by the intermediate frequency band signal conducted along the signal conduction line; and, in response to the indication of interference, control the second communication component to adjust a characteristic of the intermediate frequency band signal to mitigate the interference.

Another aspect of the present disclosure provides a method for use by a UE for wireless communication. The method includes: detecting an indication of interference to a first communication component of the UE caused by an intermediate frequency band signal conducted along a signal conduction line within the UE by a second communication component of the UE, wherein the first communication component uses a first frequency band and the intermediate frequency band signal overlaps with the first frequency band; and, in response to the indication of interference, adjusting the intermediate frequency band signal to mitigate the interference.

Another aspect of the present disclosure provides an apparatus for wireless communication. The apparatus includes: means for communicating signals using a first frequency band; means for generating an intermediate frequency band signal, the intermediate frequency band overlapping with the first frequency band; means for conducting the intermediate frequency band signal internally within the apparatus; means for detecting an indication of interference with the means for communicating signals using a first frequency band caused by the means for conducting the intermediate frequency band signal; and means, operative in response to the indication of interference, for adjusting the intermediate frequency band signal to mitigate the interference.

Another aspect of the present disclosure provides a non-transitory machine-readable storage medium having one or more instructions which when executed by a processing circuit of a UE causes the processing circuit to: communicate signals to an external device using a first frequency band; generate an intermediate frequency band signal, the intermediate frequency band overlapping with the first frequency band; conduct the intermediate frequency band signal internally within the UE; detect an indication of interference with the signals communicated using the first frequency band caused by the intermediate frequency band signals; and, in response to the indication of interference, adjust the intermediate frequency band signal to mitigate the interference.

BRIEF DESCRIPTION OF THE DRAWINGS

FIG. 20 is a flow chart diagram summarizing exemplary mitigation procedures that may be performed by a UE according to some aspects of the disclosure.

FIG. 22 is a block diagram illustrating additional exemplary device components according to some aspects of the disclosure.

DETAILED DESCRIPTION

Figure 1:
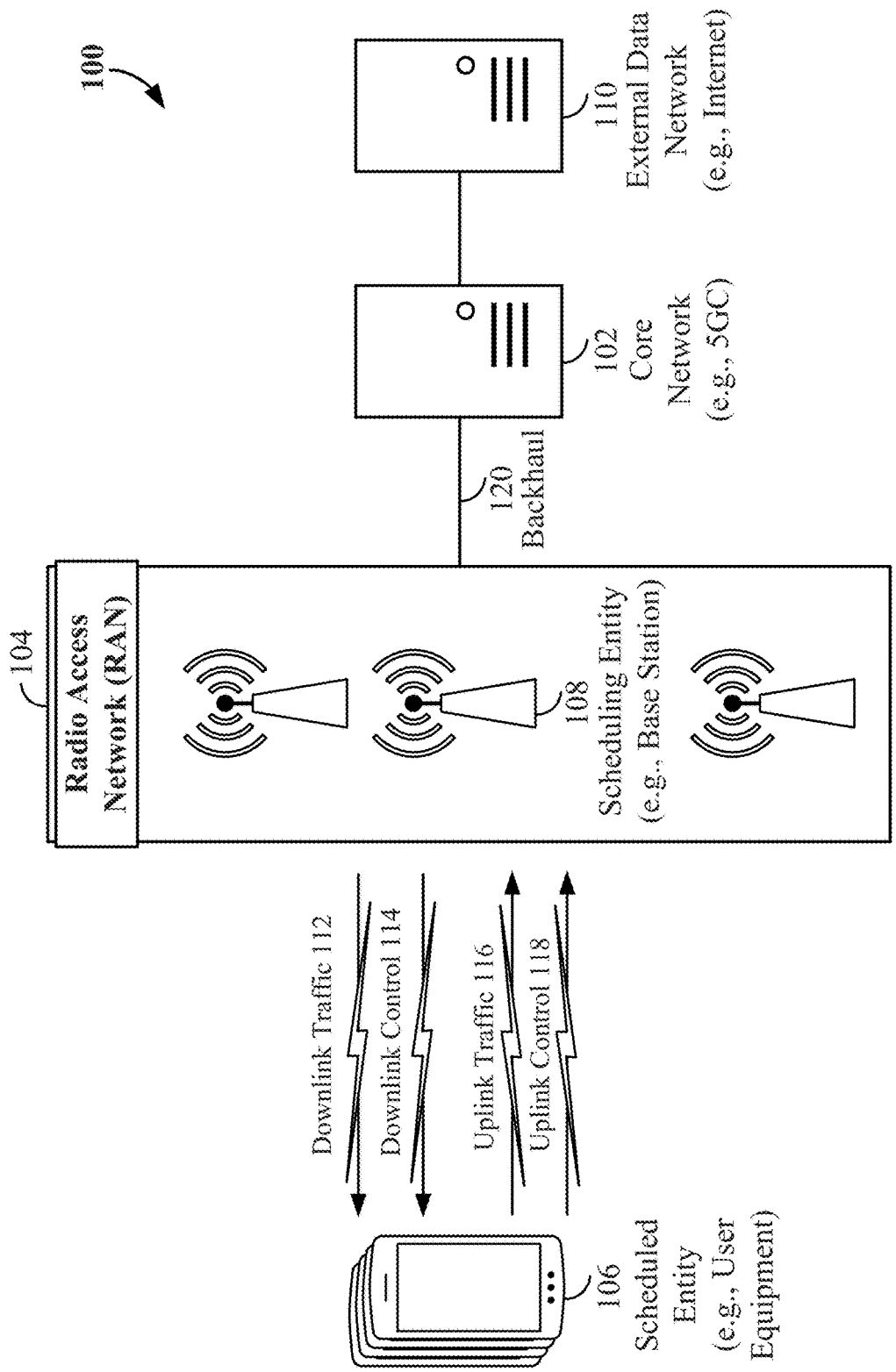
FIG. 1 is a schematic illustration of a wireless communication system having a user equipment (UE) configured according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range across a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitutions.

Aspects of the present disclosure provide various apparatuses, methods, and systems that provide internal radio frequency (RF) coexistence mitigations within user equipment (UE) handsets or other mobile devices. In this regard, a UE may be configured to include both intermediate frequency (IF) millimeter wave (mmWave) transceiver and an ultra-wide band (UWB) transceiver. As understood by those skilled in the art, an IF is a frequency to which a signal is shifted or converted as an intermediate stage in transmission or reception. Examples of IF signals are provided below. The initial signal may be, for example, a baseband signal. The final signal for transmission may be at higher frequency than the IF signal. An IF band or IF bandwidth is the frequency band or bandwidth encompassing such IF signals. IF mmWave signals or other RF signals radiated internally within the UE (due, for example, to a lack of adequate shielding of signal conduction interconnection lines among the internal components) can interfere with other transceiver components causing a de-sense of signals. For example, IF mmWave signals radiated internally with a UE can potentially interfere with the UWB transceiver causing a de-sense of UWB signals. Conversely, UWB signals radiated internally with a UE can potentially interfere with the mmWave transceiver causing a de-sense of the mmWave signals.

Herein, in some aspects, various techniques for mitigating IF band interference within a UE are disclosed and described. Some of the techniques exploit one or more performance metrics. Generally speaking, tradeoffs may be achieved in various performance metrics depending upon whether IF band interference occurs and whether actions are taken to mitigate the interference. For example, a tradeoff may be achieved between a reduction in power usage efficiency during IF mmWave operation and a decrease in de-sense events for UWB transmissions/receptions. As a practical matter, and as explained below, degrading mmWave performance to mitigate UWB de-sense may be better than blanking the mmWave IF entirely during UWB operation. Accordingly, in some aspects, the provision of mechanisms for detecting and mitigating IF band interference within a UE allows for the intelligent selection and control of various tradeoffs in key performance indicators (KPIs), as compared to UEs that lack those mechanisms. Some such tradeoffs may be made during the design and development of the UE and others during the operation of the UE, as determined by the operation of the processor or other controller.

Before discussing the RF coexistence mitigations, an overview of a wireless communication system in which one of more UEs may be used is provided. The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a UE 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant quality of service (QoS) for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108 or a UE). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UE 106, which may be a scheduled entity, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. In some examples, the scheduled entity 106 may transmit the uplink traffic 116 using frequency hopping. In some examples, the scheduling entity may transmit the downlink traffic 112 using frequency hopping.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology (RAT) used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
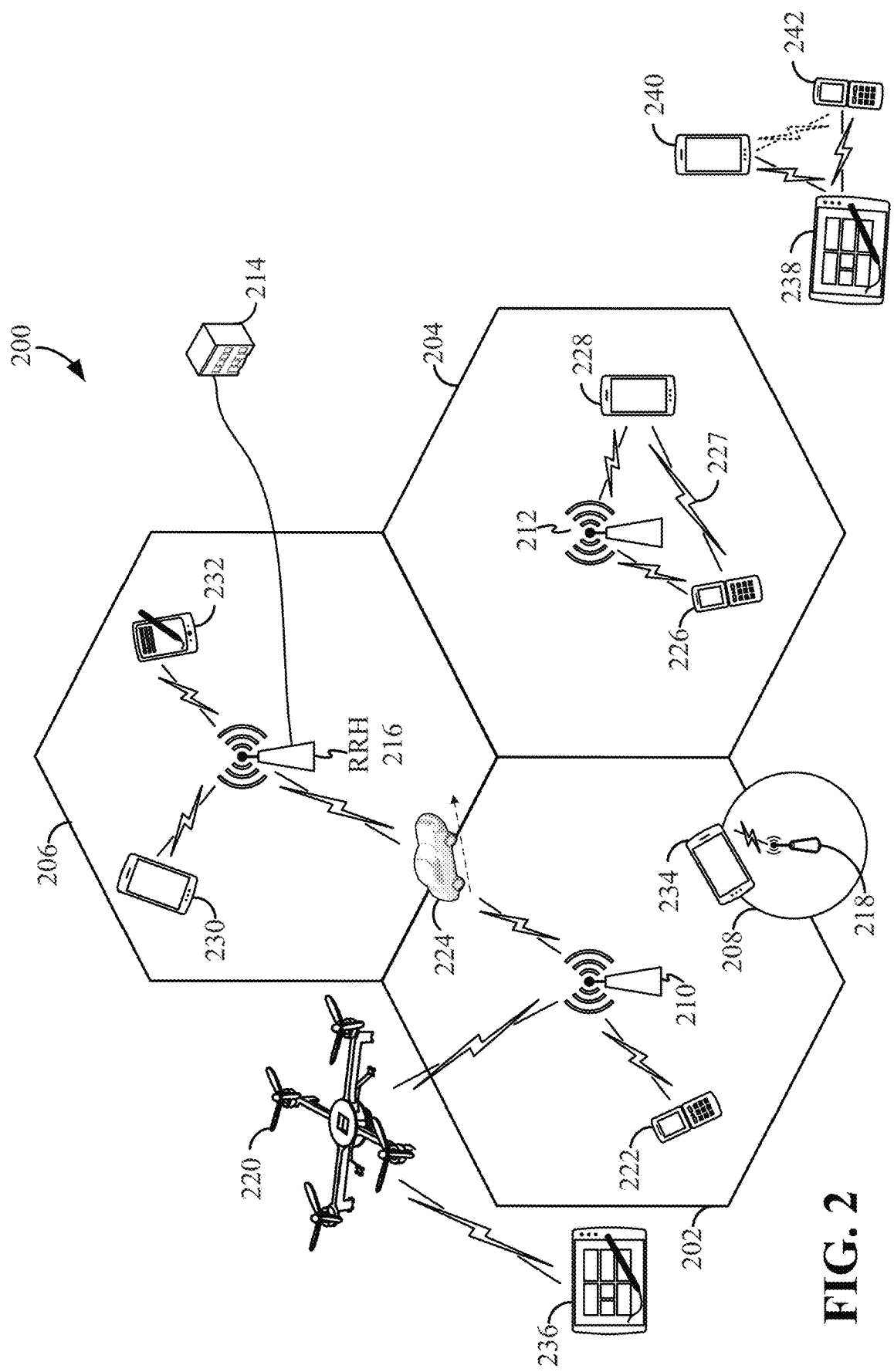
FIG. 2 is a conceptual illustration of an example of a radio access network according to some aspects of the disclosure.

FIG. 2 is a conceptual illustration of an example of a RAN 200 according to some aspects. In some examples, the RAN 200 may be the same as the RAN 104 described above and illustrated in FIG. 1. The geographic area covered by the RAN 200 may be divided into cellular regions (cells) that can be uniquely identified by a UE based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1. The UEs may use frequency hopping to communicate with the base stations or cells.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE. The UE may use a first set of RBs for downlink communication and a second set of RBs for uplink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., a physical downlink shared channel (PDSCH) or a physical uplink shared channel (PUSCH)). In various examples, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
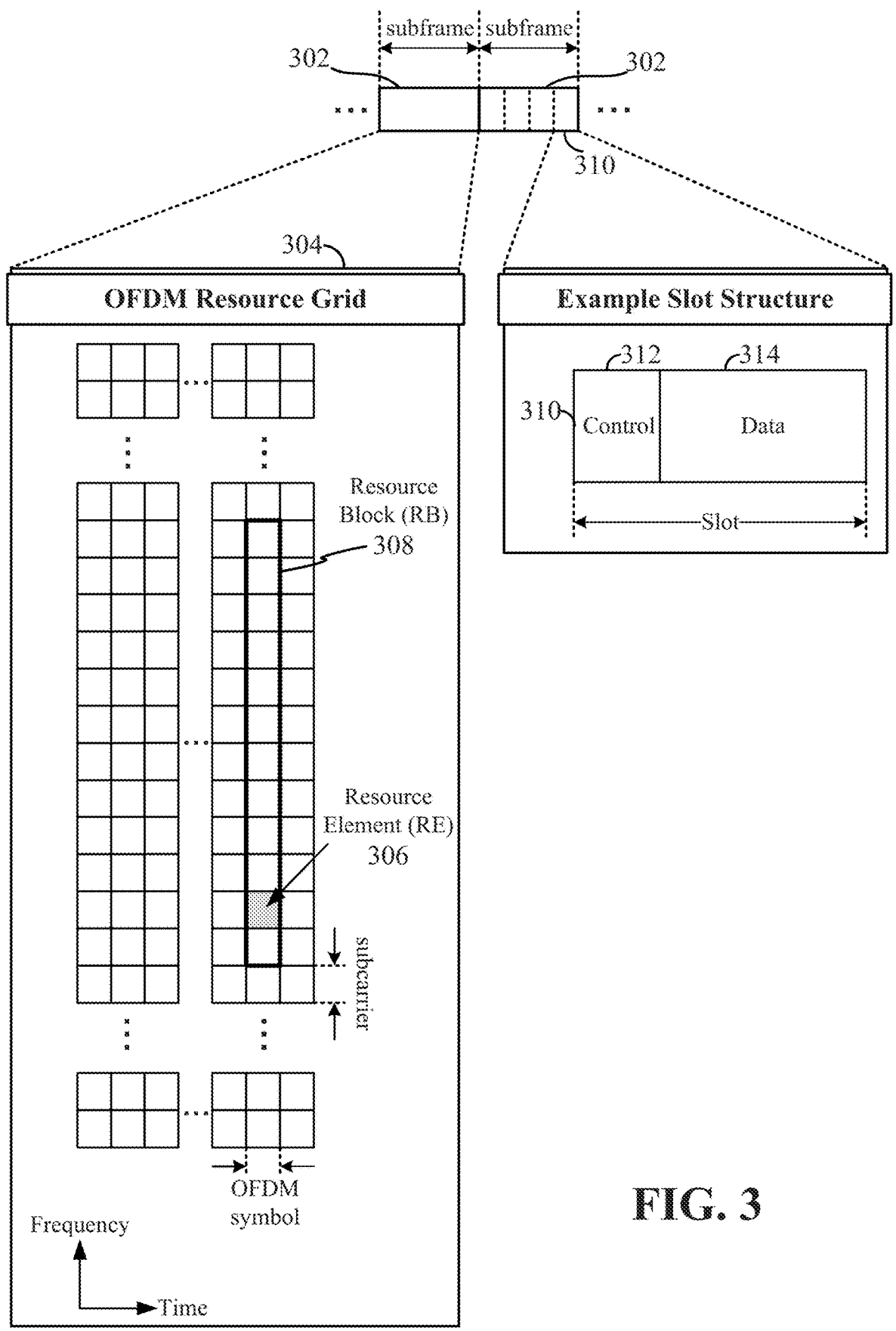
FIG. 3 is a schematic illustration of an organization of wireless resources in an air interface utilizing orthogonal frequency divisional multiplexing (OFDM) according to some aspects of the disclosure.

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc. The PDCCH may carry downlink control information (DCI) for one or more UEs in a cell. This can include, but is not limited to, power control commands, scheduling information, a grant, and/or an assignment of REs for DL and UL transmissions. In some examples, the PDCCH may carry frequency hopping control information of the PDSCH.

In an UL transmission, a transmitting device (e.g., a scheduled entity 106) may utilize one or more REs 306 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

The channels or carriers described above and illustrated in FIGS. 1-3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs.

In an exemplary 5G NR network, UL communication (e.g., PUSCH and PUCCH) may frequency hopping. Two exemplary frequency hopping modes are intra-slot hopping and inter-slot hopping. In intra-slot hopping, the UL communication may hop within a slot of the scheduled PUSCH/PUCCH symbols. In inter-slot hopping, the UL communication may hop every slot for PUSCH/PUCCH with slot aggregation. In a PUSCH inter-slot hopping example, based on an absolute slot index, the starting RB may be offset by a number of RBs in the odd-numbered slots where the offset is indicated in the downlink control information (DCI). DCI is a special set of control information that schedules PDSCH or PUSCH. In a PUCCH inter-slot hopping example, the scheduling entity (e.g., a base station) may use radio resource control (RRC) signaling to configure two starting PRB s, one for odd-numbered slots and the other for even-numbered slots. In some aspects of the disclosure, frequency hopping may be applied to a PDSCH as described in more detail below.

In some aspects of the disclosure, a 5G NR UE may have reduced capabilities than a premium device or full capability device (e.g., smartphone). An NR-Light UE is one example of a device with reduced capabilities. For example, an NR-Light UE may have a maximum supported bandwidth that is narrower than the full bandwidth of the scheduled band (e.g., 50 MHz for 15 kHz and 100 MHz for 30/60 kHz for band N78). An exemplary NR-Light UE may only support 10 MHz or 20 MHz of the bandwidth in a scheduled band or bandwidth part (BWP). A BWP is a subset of contiguous PRBs among the available time-frequency resources (e.g., OFDM resource grid 304 in FIG. 3). A UE may be configured with one or more BWPs in the uplink and one or more BWPs in the downlink. In general, one BWP in the UL and one BWP in the DL are active at a given time. BWP configuration parameters include numerology, frequency location, bandwidth size, and control resource set (CORESET). An NR-Light UE may have fewer receiving (Rx) antennas than a premium UE (e.g., smartphone). Therefore, the NR-Light UE may suffer from potential coverage reduction due to reduced bandwidth support and/or fewer antennas for diversity reception.

Figure 4:
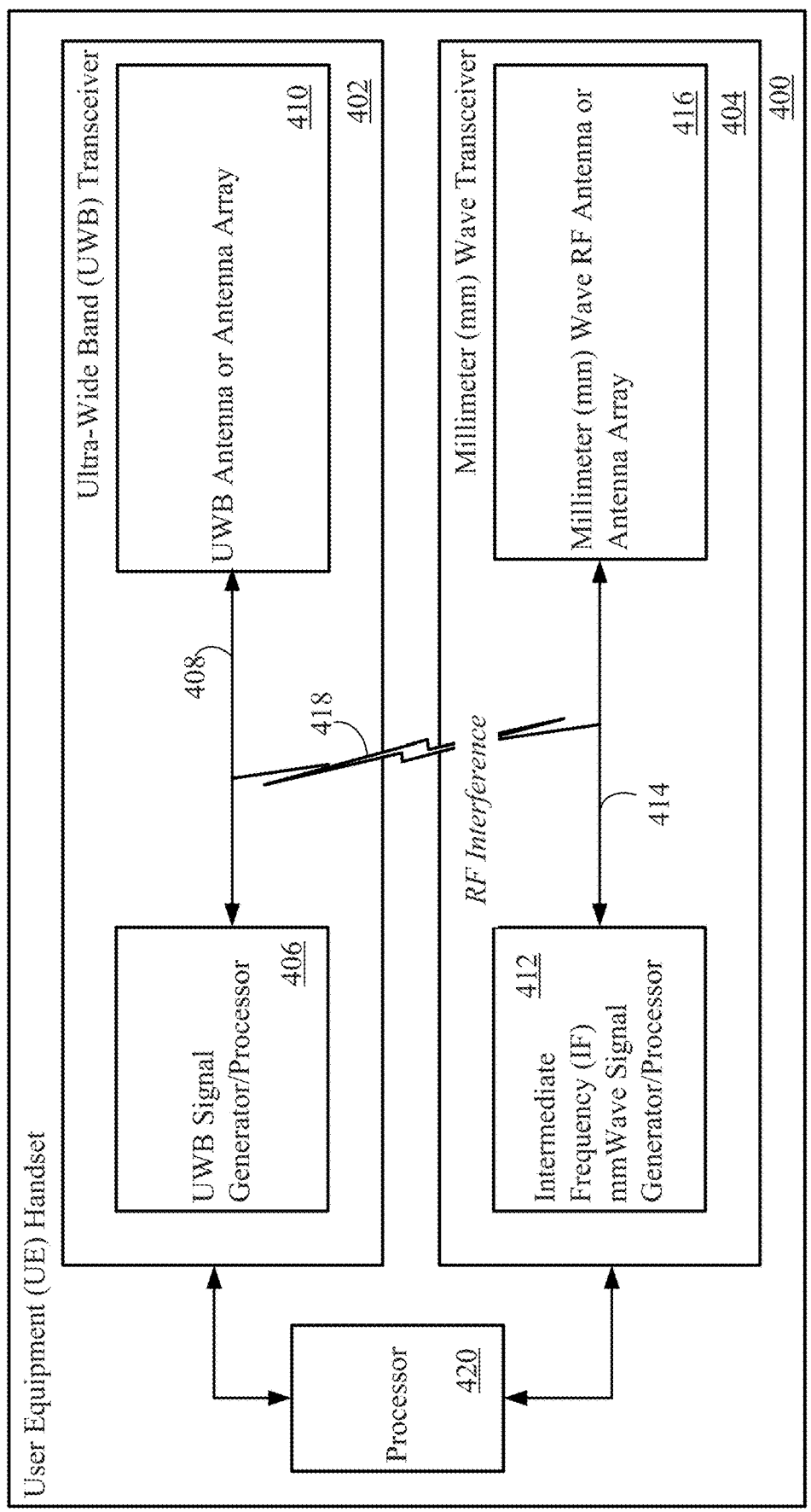
FIG. 4 is a block diagram illustrating transceiver components of a UE that may induce internal RF interference and signal de-sense according to some aspects of the disclosure.

Turning now to FIG. 4, aspects of exemplary RF coexistence issues and mitigations will now be described. Herein, RF coexistence mitigation is a mitigation applied to permit coexistence of two or more RF components within a device or a procedure applied by the device to mitigate or reduce RF coexistence issues or problems. FIG. 4 illustrates a UE handset 400, which includes an ultra-wide band (UWB) transceiver 402 and an mmWave transceiver 404, which may include both IF mmWave components and mmWave RF components. (The UWB transceiver 402 may also be referred to herein as a first communication component and the mmWave transceiver 404 may also be referred to herein as a second communication component.) The UWB transceiver includes a UWB signal generator/processor 406 connected via a physical connection or conduction line 408 to a UWB antenna or antenna array 410. The mmWave transceiver 404 includes an IF mmWave signal generator/processor 412 connected via a physical IF connection or conduction line 414 to an mmWave RF antenna or antenna array 416, which is configured to take an mmWave IF signal as input and convert it to a mmWave RF signal. (Note that the IF mmWave signal generator/processor 412 may also be referred to as an IF mmWave transceiver since it includes components for sending and receiving IF mmWave signals.) The UWB signals may be used, for example, to detect or communicate with local assets of the user of the UE, such as a key fob, automobile car door locking system, etc. The mmWave RF signals may be used in connection with a wireless communication system such as the one illustrated in FIGS. 1-3 and described above.

While the mmWave transceiver 404 is in use, RF signals may be radiated or propagated internally (e.g. leaked) within the UE handset 400 from connection line 414 to connection line 408 or one of the other components of the UWB transceiver 402. (Arrow 418 represents the radiated or leaked RF signals. Although arrow 418 is shown extending from line 414 to line 408, it should be understood that the leaked signals may directly or indirectly couple into other components. For example, a manifestation of de-sense includes 414 radiating internally within the device and coupling into component 410.) This may occur due to a lack of adequate shielding around the interconnection line 414 or for other reasons that limit isolation between UWB/mmWave. The radiated signals 418 may interfere with signals conducted along line 408, particularly if the signals have overlapping frequency bands. For example, if the mmWave transceiver 404 is operating at about 8 gigahertz (GHz), and the UWB transceiver 402 is operating at Channel 9 of the UW band (which is 7.987.2 GHz), the radiated signals may interfere with any UWB signals that are received or transmitted by UWB transceiver 402 resulting in a de-sense of the UWB signals. That is, in this example, the mmWave transceiver is a strong aggressor to UWB. The mmWave IF power may be, e.g., about −15 dBm for DL and UL, whereas the UWB noise floor may be −87 dBm/500 MHz. Hence, IF leakage at −15 dBm-65 dB can cause an 8 dB de-sense.

Herein, a de-sense is a degradation in RF signal sensitivity due to one or more RF noise sources. Typically the RF noise sources are generated by the same device that suffers the de-sense. In the example of FIG. 4, the mmWave transceiver 404 is the aggressor and the UWB transceiver 402 is the victim. (Examples will be described below where the roles are reversed.) A processor 420 is connected to one or both of the transceivers and may be configured to control one or both of the transceivers to perform one or more mitigations that reduce or eliminate the RF interference 418 by an amount sufficient to prevent any significant de-sense of the UWB signals.

Figure 5:
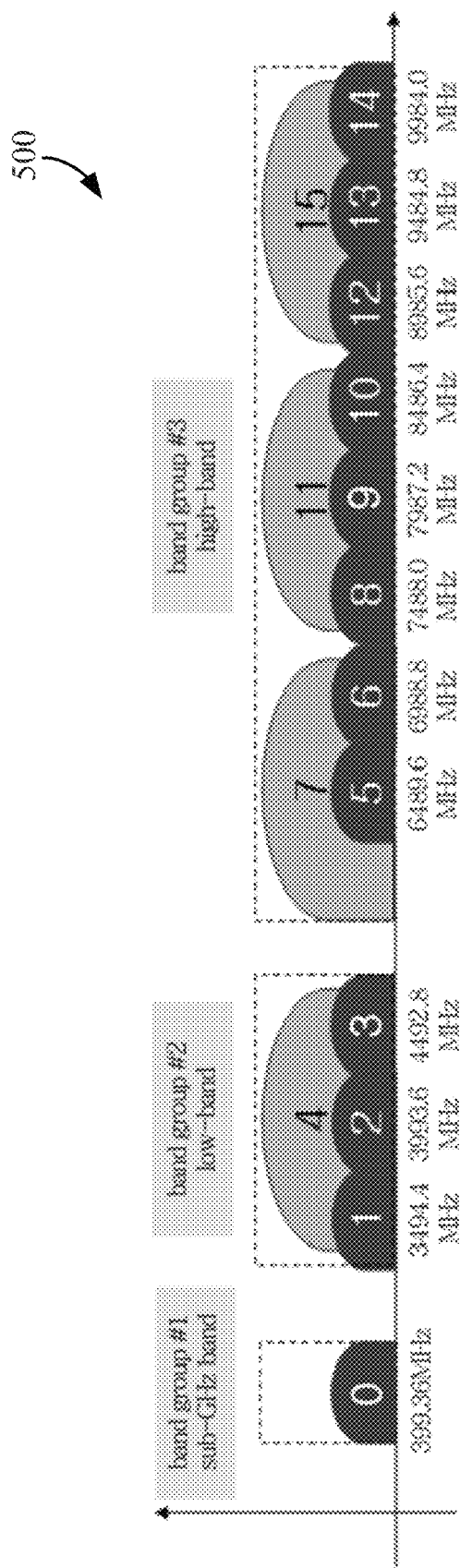
FIG. 5 is a diagram illustrating ultra-wide band (UWB) channels according to some aspects of the disclosure.

FIG. 5 illustrates exemplary frequency bands 500 of the UWB spectrum, including various channels, such as Channel 9 at 7.987.2 GHz. Any IF mmWave band signals transmitted or received at about 8 GHZ may overlap with Channel 9 such that the aforementioned RF signals radiated from the IF mmWave connection line may interfere with Channel 9 UWB signals received or transmitted by the UWB transceiver. (It is noted that, currently, the mmWave IF signals range from 7.8 to 10 GHz but future mmWave designs may extend mmWave IF frequency in both directions.)

Figure 6:
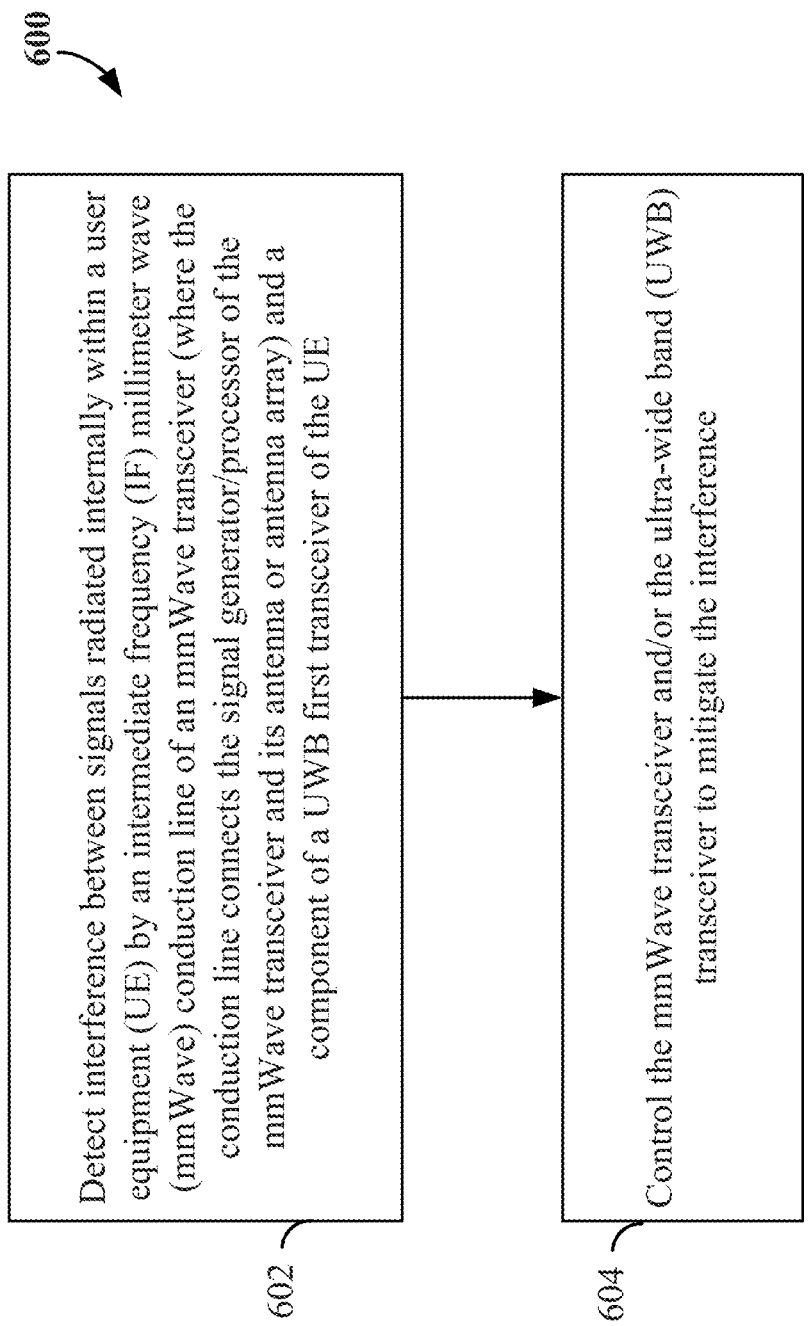
FIG. 6 is a flow chart diagram summarizing exemplary mitigation procedures according to some aspects of the disclosure.

FIG. 6 summarizes an exemplary RF interference mitigation procedure 600 for use by the processor of the UE of FIG. 4 (or by other suitably equipped or configured components). Briefly, at block 602, the processor detects interference between signals radiated internally within a UE by an IF mmWave conduction line of an mmWave transceiver (where, as shown in FIG. 6, the conduction line may connect the signal generator/processor of the mmWave transceiver and its antenna or antenna array) and a component of a UWB first transceiver of the UE (such as its own conduction line). At block 604, the processor controls the mmWave transceiver and/or the UWB transceiver to mitigate or reduce the interference. As noted, the UWB frequency band may be Channel 9 of the UWB spectrum and the IF mmWave frequency band may overlap with Channel 9 of the UWB spectrum. In other examples, instead of an UWB transceiver, the victim device may be a wireless local area network (WLAN) transceiver operating at about 6 GHz with the mmWave transceiver operating at about the same frequency. (Note that 6 GHz WLAN overlaps with UWB Channel 5.) Exemplary system and procedures for detecting the interference and mitigating the interference now will be described with reference to the remaining figures. Some of these mitigations may result in a degradation of performance of IF mmWave transmissions, such as by reducing IF mmWave transmission power. However, as a practical matter, degrading mmWave IF performance to mitigate de-sense may be better than blanking the mmWave IF.

Figure 7:
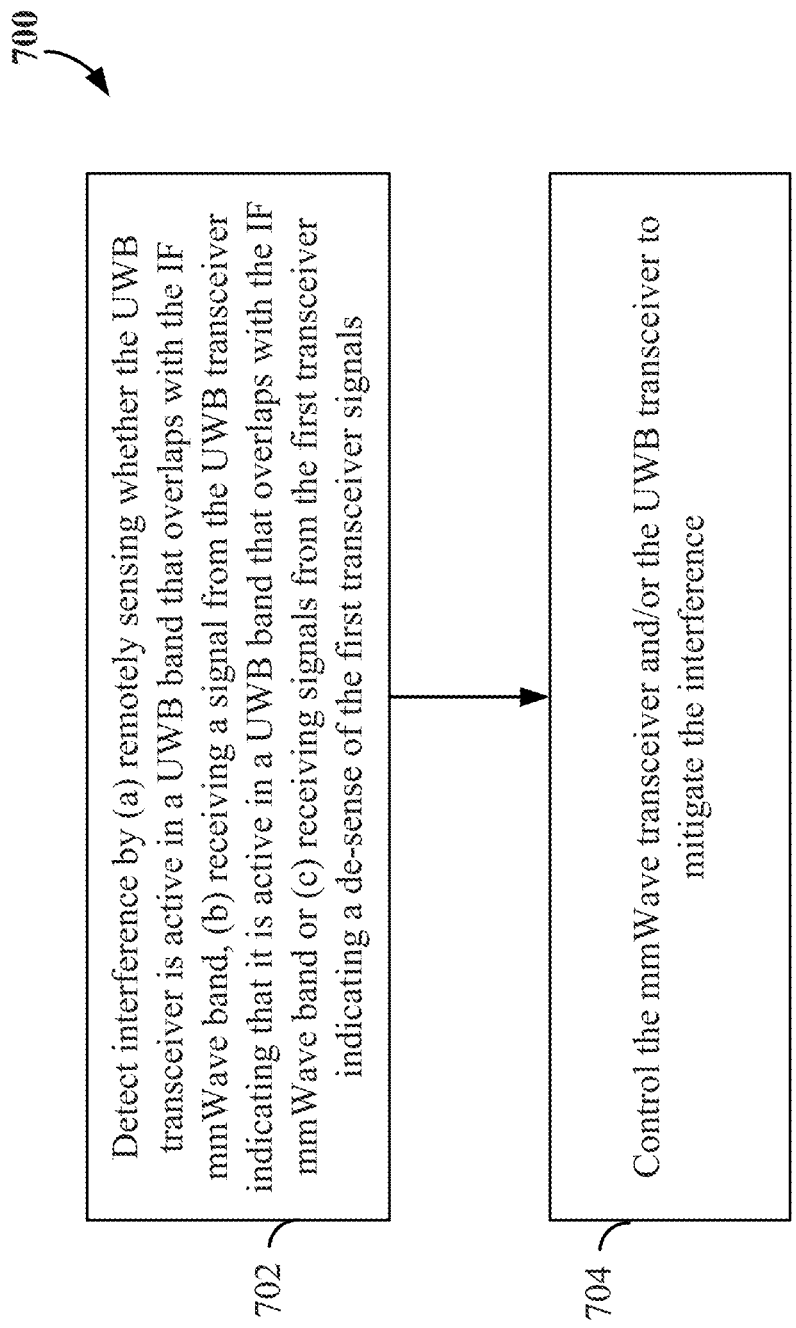
FIG. 7 is a flow chart diagram illustrating exemplary interference detection procedures according to some aspects of the disclosure.

FIG. 7 summarizes exemplary procedures 700 wherein the processor detects interference between the signals radiated by an IF mmWave connection line and a UWB transceiver. Briefly, at block 702, the processor detects the interference by (a) remotely sensing whether the UWB transceiver is active in a UWB band that overlaps with the IF mmWave band (using a suitable sensing device installed in the UE), (b) receiving a signal from the UWB transceiver indicating that it is active in a UWB band that overlaps with the IF mmWave band and/or (c) receiving signals from the first transceiver indicating a de-sense of the first transceiver signals. Method (a) may be performed, for example, if the UWB transceiver is not equipped to output the information of (b) and (c). At block 704, the processor controls the mmWave transceiver and/or the UWB transceiver to mitigate the interference.

Figure 8:
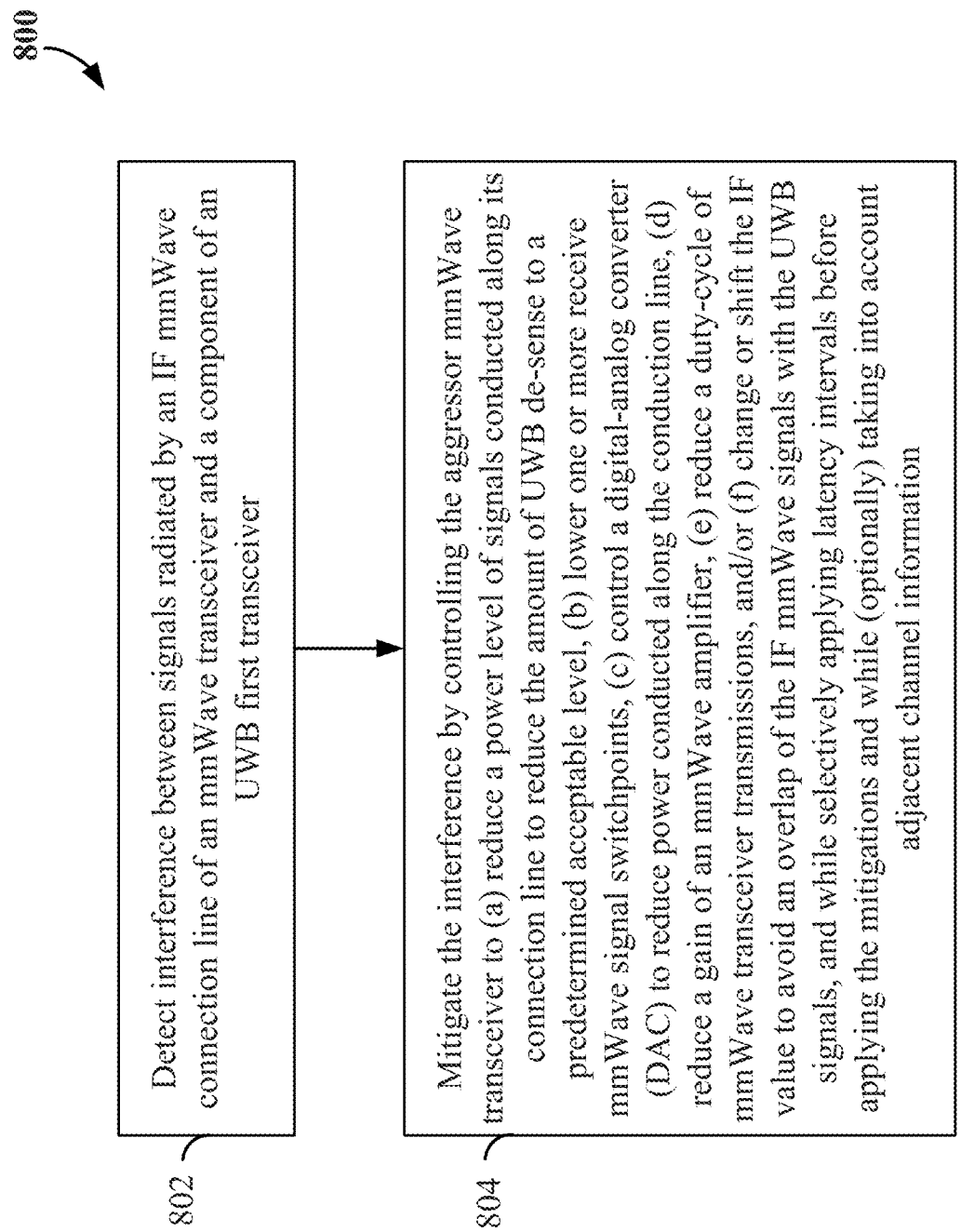
FIG. 8 is a flow chart diagram illustrating exemplary mitigation procedures for use when a millimeter wave (mmWave) transceiver is the aggressor according to some aspects of the disclosure.

FIG. 8 summarizes exemplary procedures 800 for use when the UWB transceiver is the victim and the mmWave transceiver is the aggressor. Briefly, at block 802, the processor again detects interference between signals radiated by an IF mmWave connection line of an mmWave transceiver and a component of an UWB first transceiver (using, for example, the method of block 702 of FIG. 7. Then, at block 804, the processor mitigates the interference by controlling the aggressor mmWave transceiver to (a) reduce a power level of signals conducted along its connection line to, e.g., reduce the amount of UWB de-sense to some predetermined acceptable level, such as 1 db, (b) lower one or more receive mmWave signal switchpoints, (c) control a digital-analog converter (DAC) to reduce power conducted along the conduction line, (d) reduce a gain of an mmWave amplifier, (e) reduce a duty-cycle of mmWave transceiver transmissions, and/or (f) change or shift the IF value to avoid an overlap of the IF mmWave signals with the UWB signals, and while selectively applying latency intervals before applying the mitigations. For example, <10 msec of latency may be applied along with 10's to 100's of milliseconds of dwell time. Additionally, the processor may take into account adjacent channel information. Insofar as switchpoints are concerned, in one example, DL switchpoints may be lowered from a default value of −20 dBFS. The processor selects some offset level to be applied across all gain states. Somewhere between 10 dB and 20 dB, an additional backoff is selected and peak signal to noise ratio (SNR) is reduced for higher Ior levels.

Insofar as power reduction is concerned, the output power of the IF mmWave signal generator 412 may be reduced and the gain of the mmWave antenna array 416 may be increased to compensate (thus providing for lower power signals on the connection line 414). DAC backoff to achieve the reduction in power is generally predictable and repeatable. LO signal feedthrough increases. Note that driver amplifier gain reduction can also be used to lower IF power without significant LOFT concerns, although this procedure may be somewhat less predictable. However, as already noted, a degradation in IF mmWave performance may be better than blanking the mmWave IF.

Figure 9:
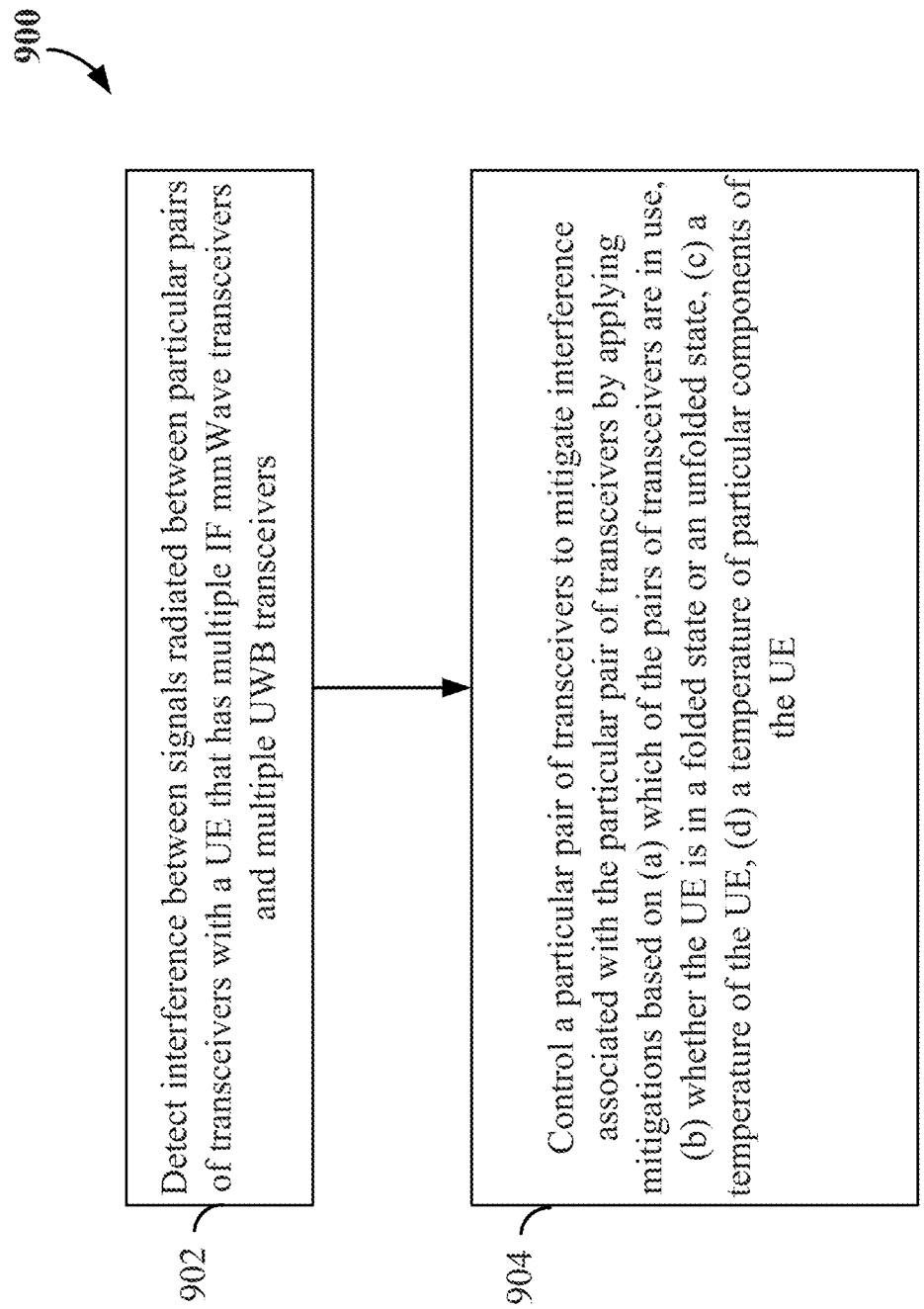
FIG. 9 is a flow chart diagram illustrating additional exemplary mitigation procedures for use with multiple pairs of transceivers according to some aspects of the disclosure.

FIG. 9 summarizes exemplary procedures 900 for use if the UE has multiple pairs of UWB and mmWave transceivers. Briefly, at block 902, the processor detects interference between signals radiated between particular pairs of transceivers with a UE that has multiple mmWave transceivers and multiple UWB transceivers (using, e.g., the procedures of block 707 of FIG. 7.) At block 904, the processor controls a particular pair of transceivers to mitigate interference associated with the particular pair of transceivers by applying mitigations based on (a) which of the pairs of transceivers are in use, (b) whether the UE is in a folded state or an unfolded state, (c) a temperature of the UE, (d) a temperature of particular components of the UE. Insofar as (b) is concerned, some UEs are foldable devices and so the distance between any pair of transceivers may change when the device is folded, increasing interference. Insofar as temperature is concerned, the efficacy of particular mitigations may vary depending upon the temperature of the UE or its components, such as particular transceivers.

Figure 10:
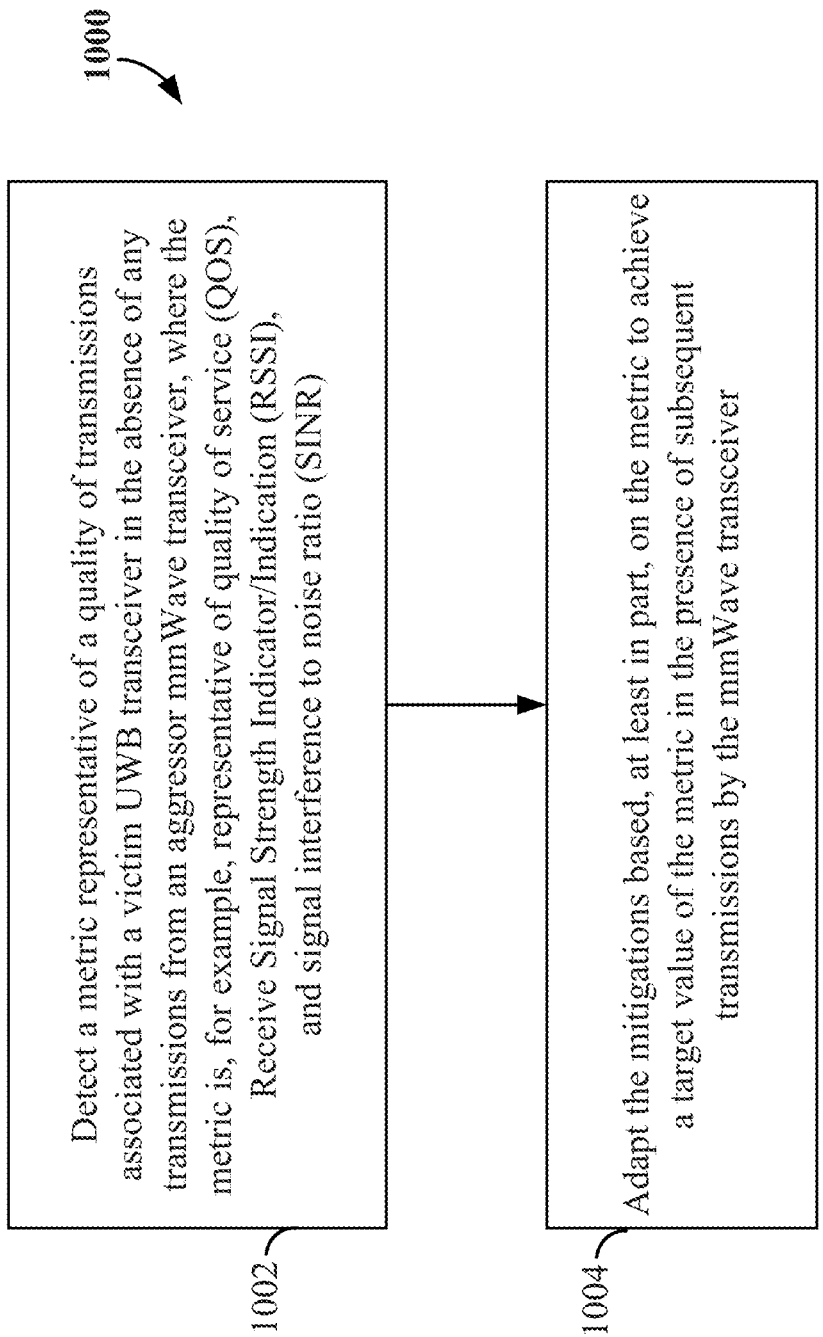
FIG. 10 is a flow chart diagram illustrating metric-based mitigation procedures for use when an mmWave transceiver is the aggressor according to some aspects of the disclosure.

In some examples, adaptive run-time or real-time mitigations are applied that are adjusted by the processor over time. FIG. 10 summarizes exemplary adaptive mitigation procedures 1000 for use by a UE. Briefly, at block 1002, the processor detects a native metric or other metric representative of a quality of transmissions associated with a victim UWB transceiver in the absence of any transmissions from an aggressor mmWave transceiver. The metric may be, e.g., representative of QoS, Receive Signal Strength Indicator/Indication (RSSI), and/or signal interference to noise ratio (SINR). At block 1004, the processor adapts the mitigations based, at least in part, on the metric to achieve a target value of the metric in the presence of or during subsequent transmissions by the mmWave transceiver.

Figure 11:
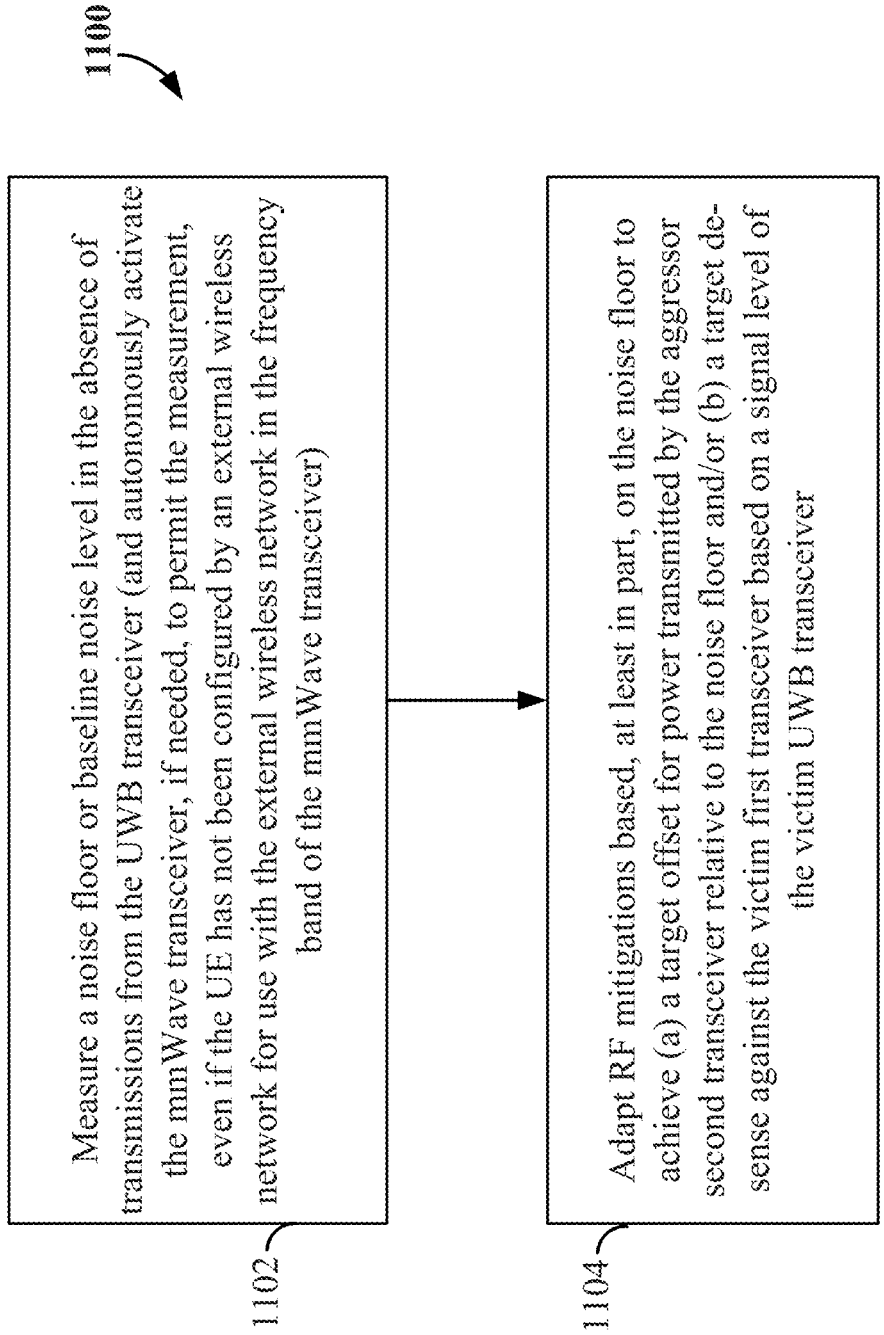
FIG. 11 is a flow chart diagram illustrating noise floor-based mitigation procedures for use when an mmWave transceiver is the aggressor according to some aspects of the disclosure.

FIG. 11 summarizes other exemplary adaptive mitigation procedures 1100 for use by a UE, where the IE is equipped with a measurement component configured to measure a noise floor or a baseline noise for the UWB transceiver. This may be a component of the UWB transceiver. Briefly, at block 1102, the processor measures a noise floor (using the measurement component) in the absence of transmissions from the victim UWB transceiver or receives the measurement from the UWB transceiver. This may include autonomously activating the mmWave transceiver, if needed, to permit the measurement, even if the UE has not been configured or activated by an external wireless network for use with the external wireless network in the frequency band of the mmWave transceiver). At block 1104, the processor adapts RF mitigations (such as adapting mmWave IP power) applied to the aggressor mmWave transceiver based, in part, on the measure of the noise floor to achieve at least one of (a) a target offset for power transmitted by the aggressor mmWave transceiver relative to the noise floor and (b) a target de-sense against the victim UWB transceiver based on a signal level of the victim UWB transceiver.

In some examples of FIGS. 10 and 11, the amount of mmWave IF attenuation/backoff adapts to the SINR/QOS-metric of UWB/victim-RAT in the absence of de-sense from mmWave IF (This may be referred to herein as the "victim's native SINR/QOS-metric.") This parameters addresses how much the UWB/victim-RAT signal is above its noise floor. The backoff is provided to achieve a target degradation in SINR/QoS-metric relative to the native value for UWB/victim-RAT when mmWave IF interference power is included. Note that the mmWave IF interference power is initially measured by the UWB/victim-RAT receiver in the absence of UWB/victim-RAT signal. Even if the IF mmWave feature is not configured by the 5G/NR network for the UE, the UE can autonomously turn ON mmWave IF for UWB/victim-RAT to perform the assessment. The mmWave IF attenuation/backoff is then tuned to achieve either a target offset for mmWave IF interference power from the UWB/victim-RAT noise floor, or a target de-sense against UWB/victim-RAT which can have dependency on the signal level of UWB/victim-RAT. Note that the isolation or effective isolation between mmWave IF and UWB/victim-RAT may depend on which mmWave module(s)/transceiver(s) and which UWB/victim-RAT module(s)/transceiver(s) are in-use.

Figure 12:
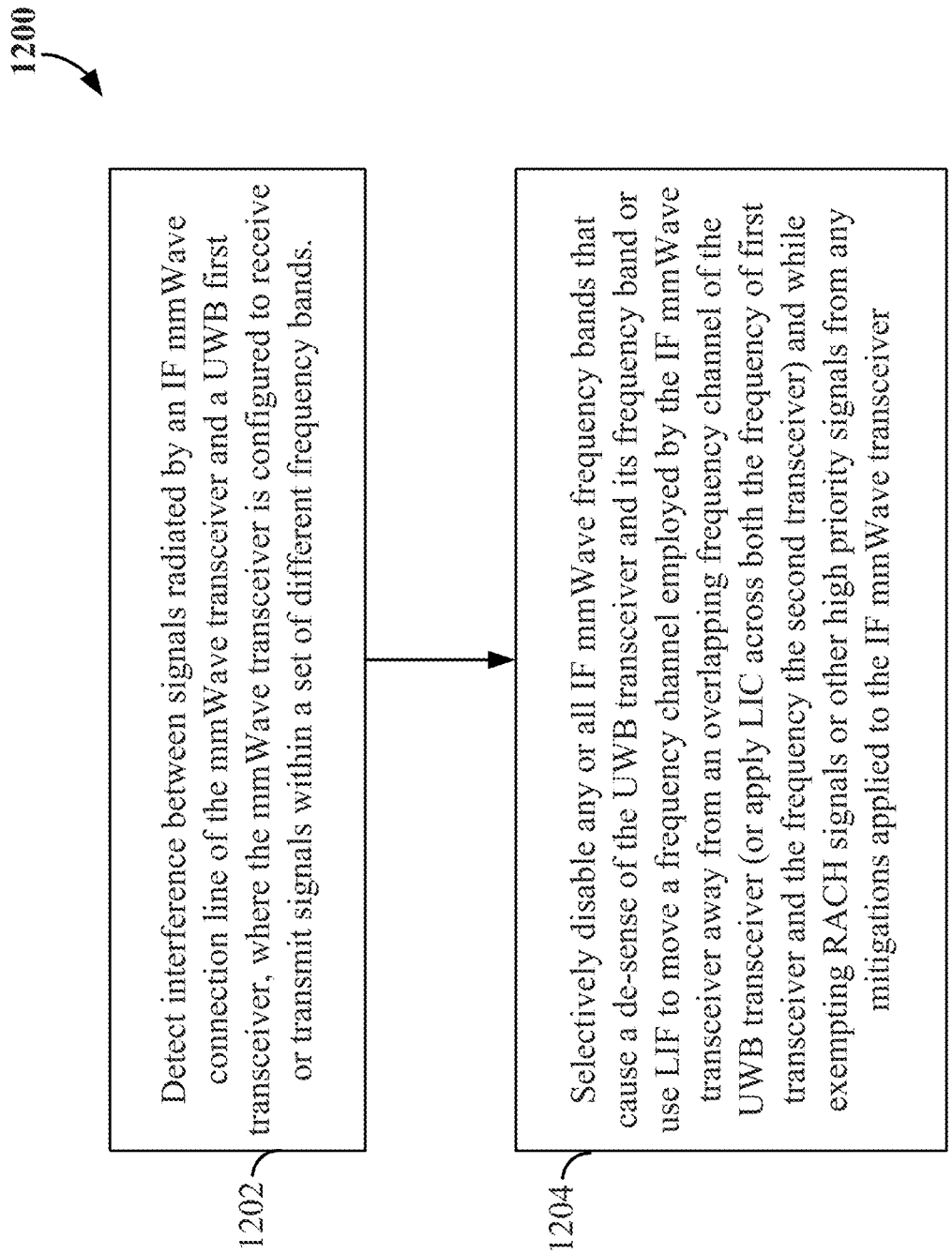
FIG. 12 is a flow chart diagram illustrating additional mitigation procedures for use when an mmWave transceiver is the aggressor according to some aspects of the disclosure.

In some examples, the mmWave transceiver is configured to receive or transmit signals within a set of different frequency bands. FIG. 12 summarizes an exemplary adaptive mitigation procedures 1200 for use by such a UE. Briefly, at block 1202, the processor detects interference between signals radiated by an IF mmWave connection line of an mmWave transceiver and a UWB first transceiver, where the mmWave transceiver is configured to receive or transmit signals within a set of different frequency bands. At block 1204, the processor selectively disables any or all IF mmWave frequency bands that cause a de-sense of the UWB transceiver and its frequency band. It is noted that this may result in IF mmWave only supporting a single-band mmWave but not an inter-band mmWave or in general a degradation or reduction of the UE's mmWave capabilities. Also at block 1204, the use of least interfered first (LIF) procedures may be applied to move a frequency channel employed by the mmWave transceiver away from an overlapping frequency channel of the UWB transceiver. Thus, in some examples, the UE use LIF to move the channel away from UWB overlap. As a practical matter, the UE usually only needs +100 MHz of shift. Additionally or alternatively, Linear Interference Cancellation (LIC) procedures may be applied across both the frequency of first transceiver and the frequency the second transceiver. Additionally, at block 1204, if the mmWave transceiver is configured to transmit random access channel (RACH) signals, the processor may exempt the RACH signals or other high priority signals from any mitigations applied to the mmWave transceiver.

Figure 13:
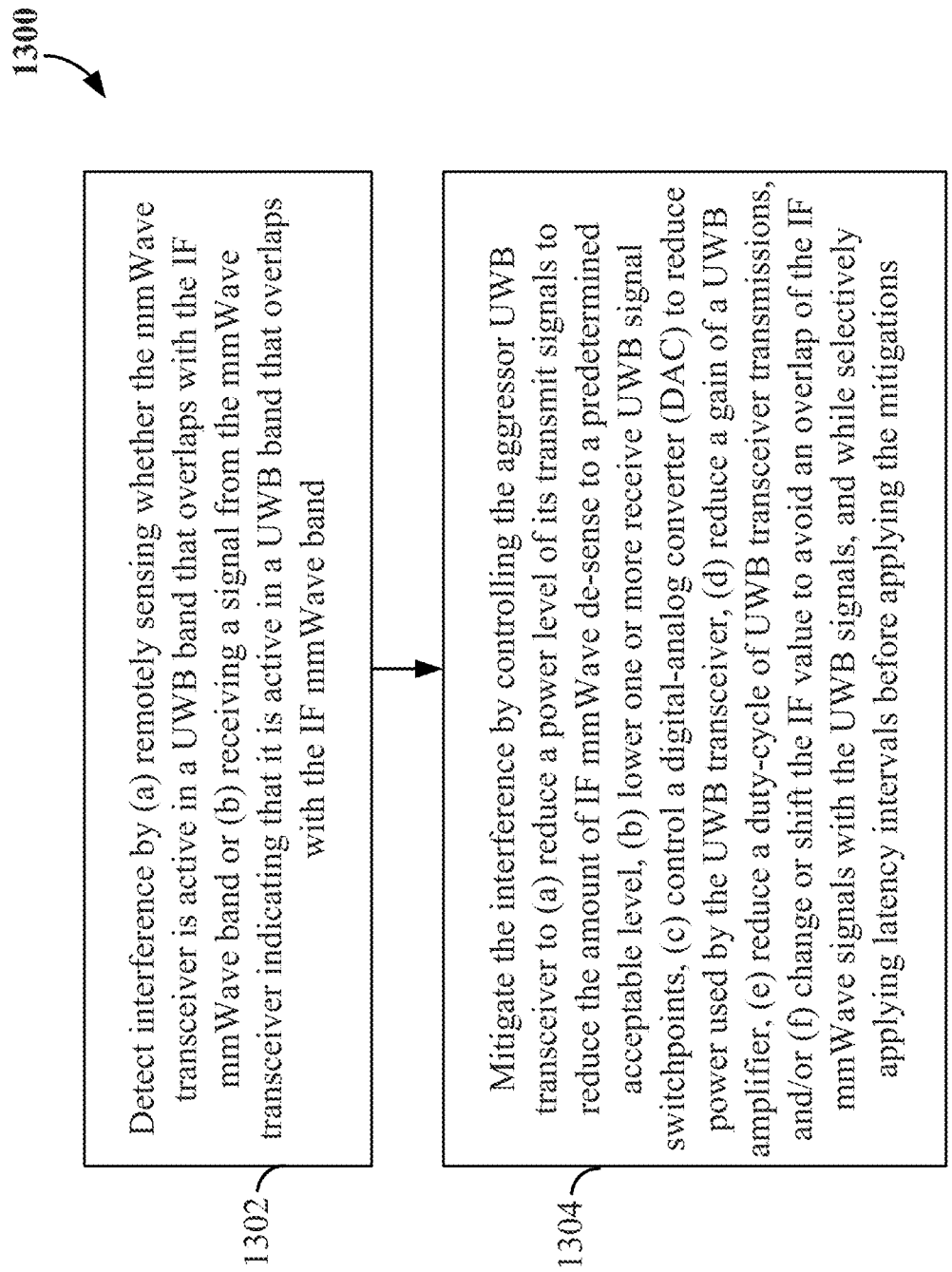
FIG. 13 is a flow chart diagram illustrating mitigation procedures for use when a UWB transceiver is the aggressor according to some aspects of the disclosure.

In some examples, the UWB transceiver is the aggressor and the mmWave transceiver is the victim. FIG. 13 summarizes exemplary mitigation procedures 1300 for use in such a UE. Briefly, at 1302, the processor detects interference by (a) remotely sensing whether the mmWave transceiver is active in a UWB band that overlaps with the IF mmWave band or (b) receiving a signal from the mmWave transceiver indicating that it is active in a UWB band that overlaps with the IF mmWave band. At block 1304, the processor mitigates the interference by controlling the aggressor UWB transceiver to (a) reduce a power level of its transmit signals to reduce the amount of IF mmWave de-sense to some predetermined acceptable level, (b) lower one or more receive UWB signal switchpoints, (c) control a digital-analog converter (DAC) to reduce power used by the UWB transceiver, (d) reduce a gain of a UWB amplifier, (e) reduce a duty-cycle of UWB transceiver transmissions, and/or (f) change or shift the IF value to avoid an overlap of the IF mmWave signals with the UWB signals, and while selectively applying latency intervals before applying the mitigations.

Figure 14:
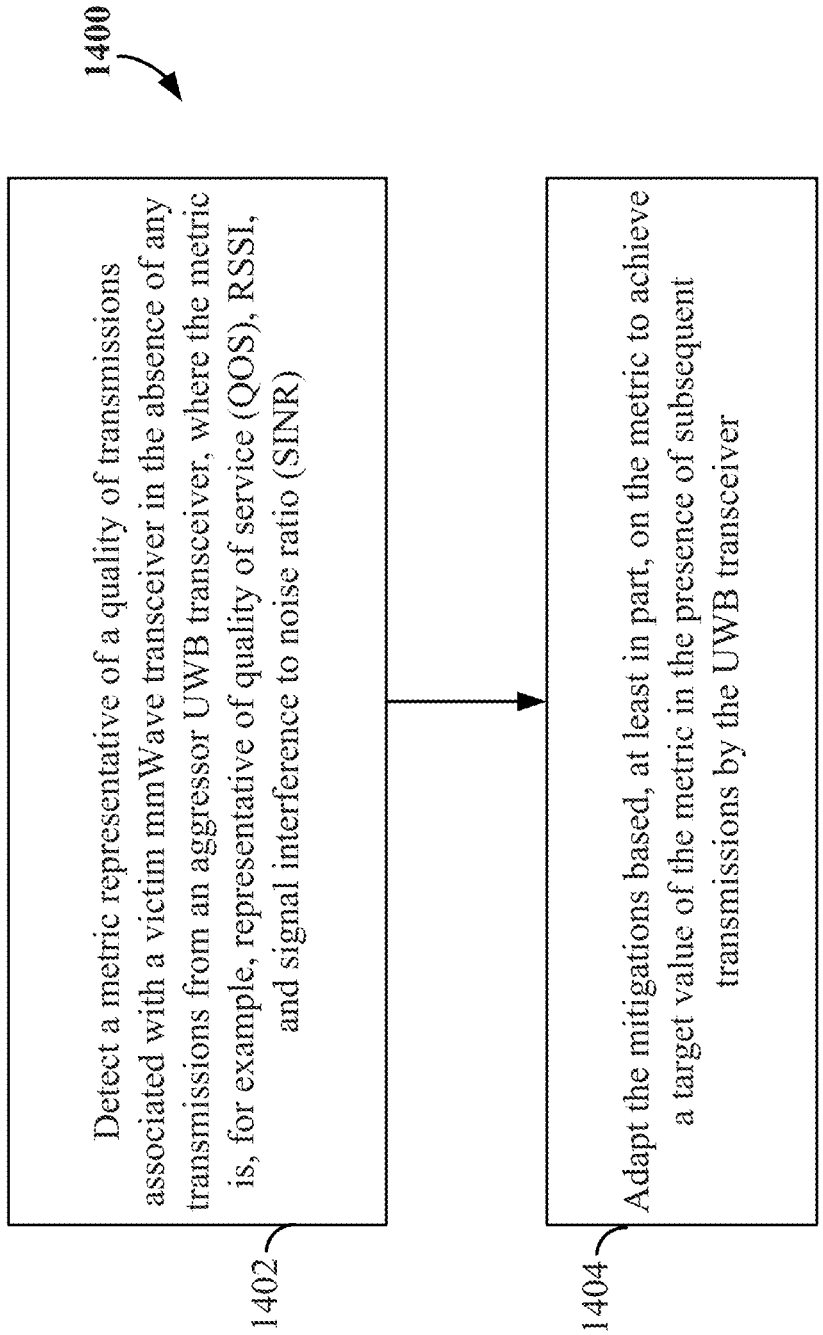
FIG. 14 is a flow chart diagram illustrating metric-based mitigation procedures for use when the UWB transceiver is the aggressor according to some aspects of the disclosure.

In some examples, adaptive run-time or real-time mitigations are applied that are adjusted by the processor over time to address interference when the UWB transceiver is the aggressor. This may be similar to adaptive mitigations applied when the mmWave transceiver is the aggressor. FIG. 14 summarizes exemplary adaptive mitigation procedures 1400 for use by a processor of the UE when UWB transceiver is the aggressor. Briefly, at block 1402, the processor detects a metric representative of a quality of transmissions associated with a victim mmWave transceiver in the absence of any transmissions from an aggressor UWB transceiver. The metric is may be, e.g., a native representative of QOS, RSSI, and/or SINR. At block 1404, the processor adapts the mitigations based, at least in part, on the metric to achieve a target value of the metric in the presence of or during subsequent transmissions by the UWB transceiver.

Figure 15:
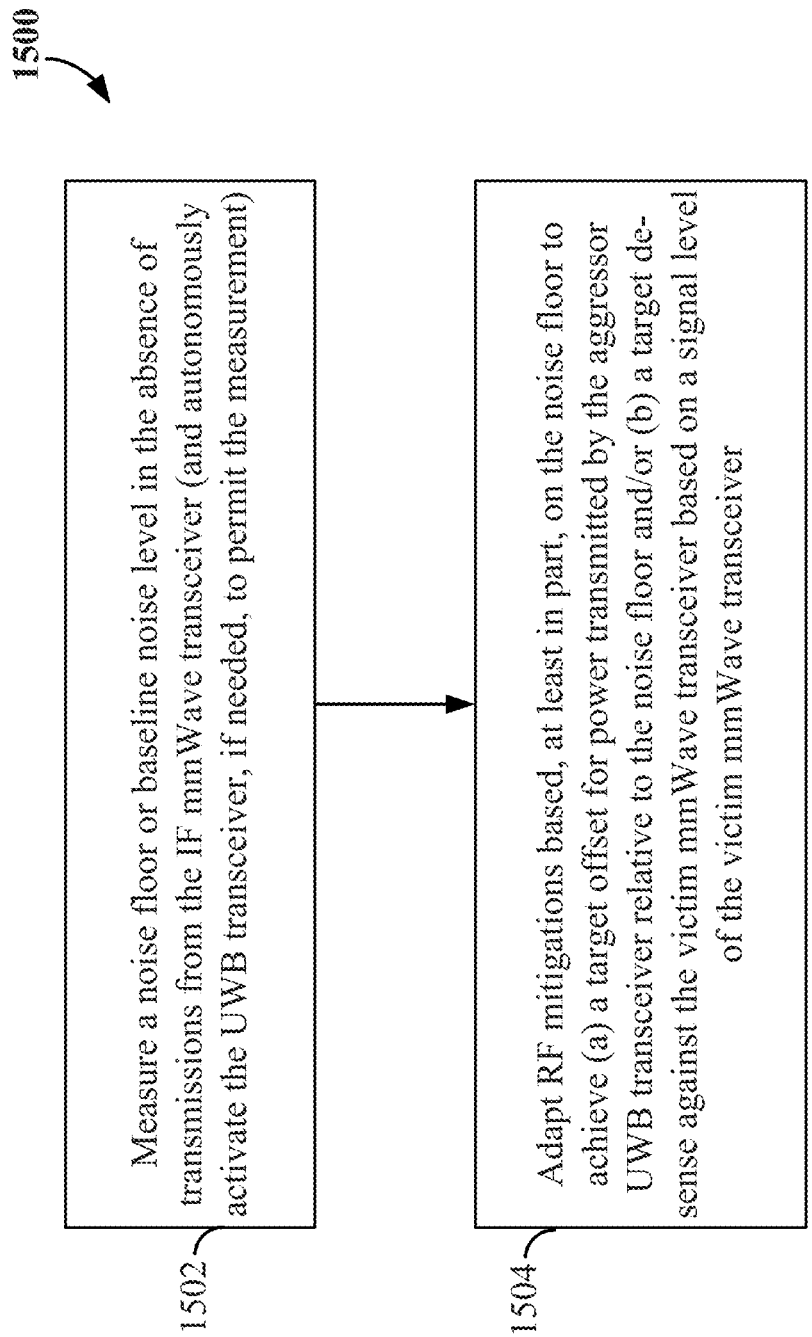
FIG. 15 is a flow chart diagram illustrating noise floor-based mitigation procedures for use when the UWB transceiver is the aggressor according to some aspects of the disclosure.

FIG. 15 summarizes additional exemplary adaptive mitigation procedures 1500 for use by a processor of the UE when UWB transceiver is the aggressor, where the UE is equipped with a measurement component configured to measure a noise floor or a baseline noise for the mmWave transceiver. This may be a component of the mmWave transceiver. Briefly, at block 1502, the processor measures a noise floor (using the measurement component) in the absence of transmissions from the victim mmWave transceiver or receives the measurement from the mmWave transceiver. This may include autonomously activating the UWB transceiver, if needed, to permit the measurement. At block 1504, the processor adapts RF mitigations applied to the aggressor UWB transceiver based, in part, on the measure of the noise floor to achieve at least one of (a) a target offset for power transmitted by the aggressor UWB transceiver relative to the noise floor and (b) a target de-sense against the victim mmWave transceiver based on a signal level of the victim mmWave transceiver.

Figure 16:
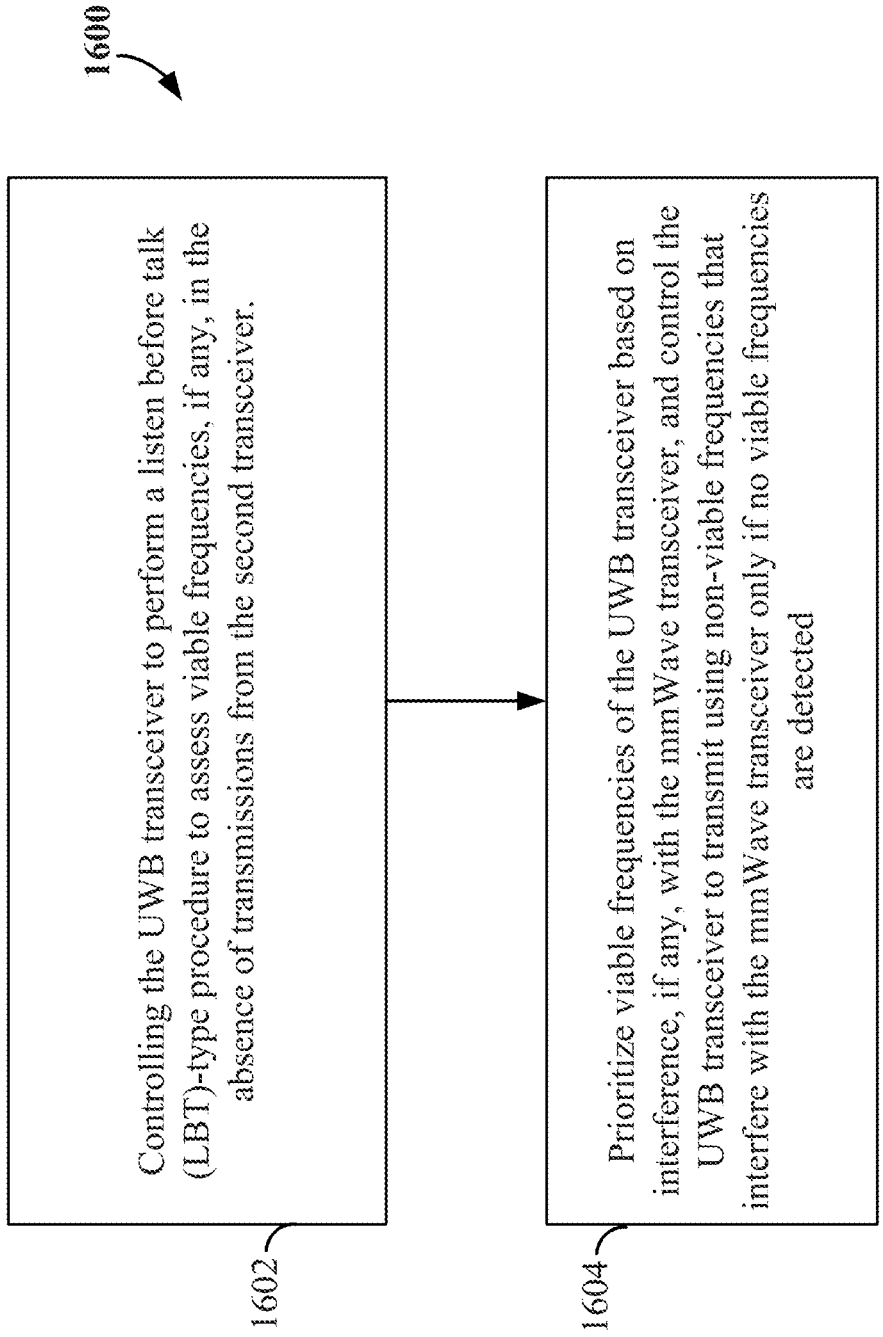
FIG. 16 is a flow chart diagram illustrating additional mitigation procedures for use when an mmWave transceiver is the aggressor according to some aspects of the disclosure.

FIG. 16 summarizes additional mitigations 1600 that may be employed within a suitably equipped UE when the UWB transceiver is the aggressor. Briefly, at block 1602, the processor controls the UWB transceiver to perform a listen before talk (LBT)-type procedure to assess viable frequencies, if any, in the absence of transmissions from the second transceiver. At block 1604, the processor prioritizes viable frequencies of the UWB transceiver based on interference, if any, with the mmWave transceiver, and controls the UWB transceiver to transmit using non-viable frequencies that interfere with the mmWave transceiver only if no viable frequencies are detected.

For example, the LBT procedures may be used to assess, in the absence of RF coexistence issue with mmWave IF, which frequencies/channels are viable (i.e. "clean" to "good enough"). Then, among the viable frequencies/channels, the processor prioritizes those which do not have a RF coexistence issue with the mmWave IF. The processor then uses viable frequencies/channels which have a RF coexistence issue with mmWave IF only as a last resort.

Thus, as shown in FIGS. 13-16, dynamic, run-time mitigations may be applied for a UWB/aggressor-RAT. In some examples, the UWB/aggressor-RAT backs off or cap maximum Tx power or the UWB/aggressor-RAT backs off or cap maximum Tx duty cycle. In the absence of mmWave IF signal, mmWave IF measures interference power from UWB/aggressor-RAT. The UWB/aggressor-RAT backs off max Tx power and/or max Tx duty cycle to achieve either a target offset for UWB/aggressor-RAT interference power from mmWave IF noise floor or a target de-sense against mmWave IF which can have dependency on the signal level of mmWave IF. The amount of backoff in UWB/aggressor-RAT max Tx power and/or max Tx duty cycle may adapt to SINR/QOS-metric of mmWave in the absence of de-sense from UWB/aggressor-RAT (e.g. a "mmWave's native SINR/QOS-metric"). This may be done to achieve a target degradation in mmWave SINR/QOS-metric relative to the native value when UWB/aggressor-RAT interference power is included.

Figure 17:
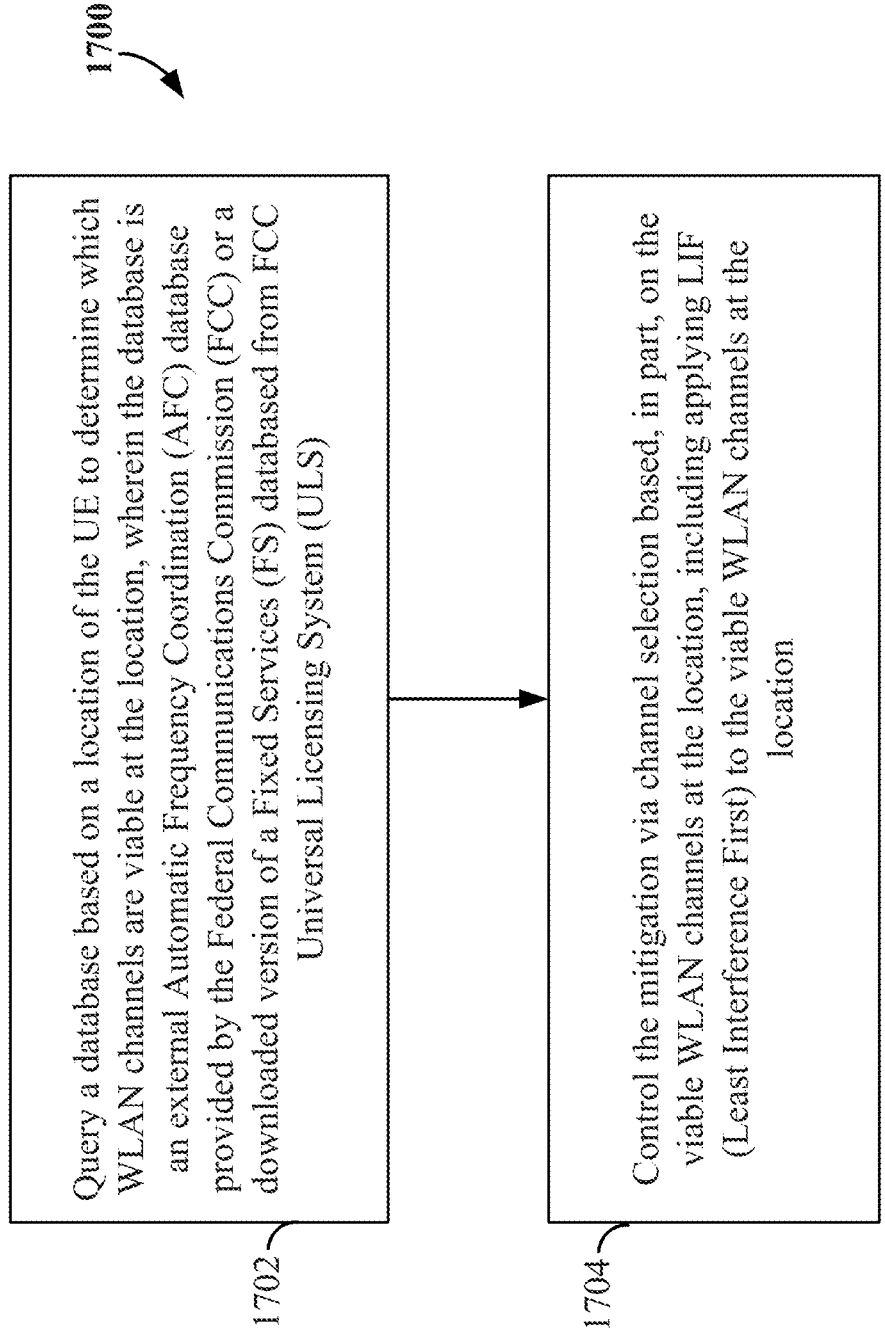
FIG. 17 is a flow chart diagram illustrating additional mitigation procedures for use with external or downloaded wireless local area network (WLAN) databases according to some aspects of the disclosure.

In some examples, one transceiver is an mmWave transceiver and another is a WLAN transceiver operating at a frequency that overlaps with the mmWave transceiver. FIG. 17 summarizes exemplary mitigation procedures 1700 for use by a processor of such a UE. Briefly, at block 1702, the processor queries a database based on a location of the UE to determine which WLAN channels are viable at the location, wherein the database is an external Automatic Frequency Coordination (AFC) database provided by the Federal Communications Commission (FCC) or a downloaded version of a Fixed Services (FS) databased from FCC Universal Licensing System (ULS). At block 1704, the processor controls the mitigation via channel selection based, in part, on the viable WLAN channels at the location. The processor can apply LIF (Least Interference First) to the viable WLAN channels at the location. Since some WLAN channels overlap with UWB channels, the list of viable WLAN channels can be converted to a list of viable UWB channels, and LIF can also be applied to the list of viable UWB channels.

Figure 18:
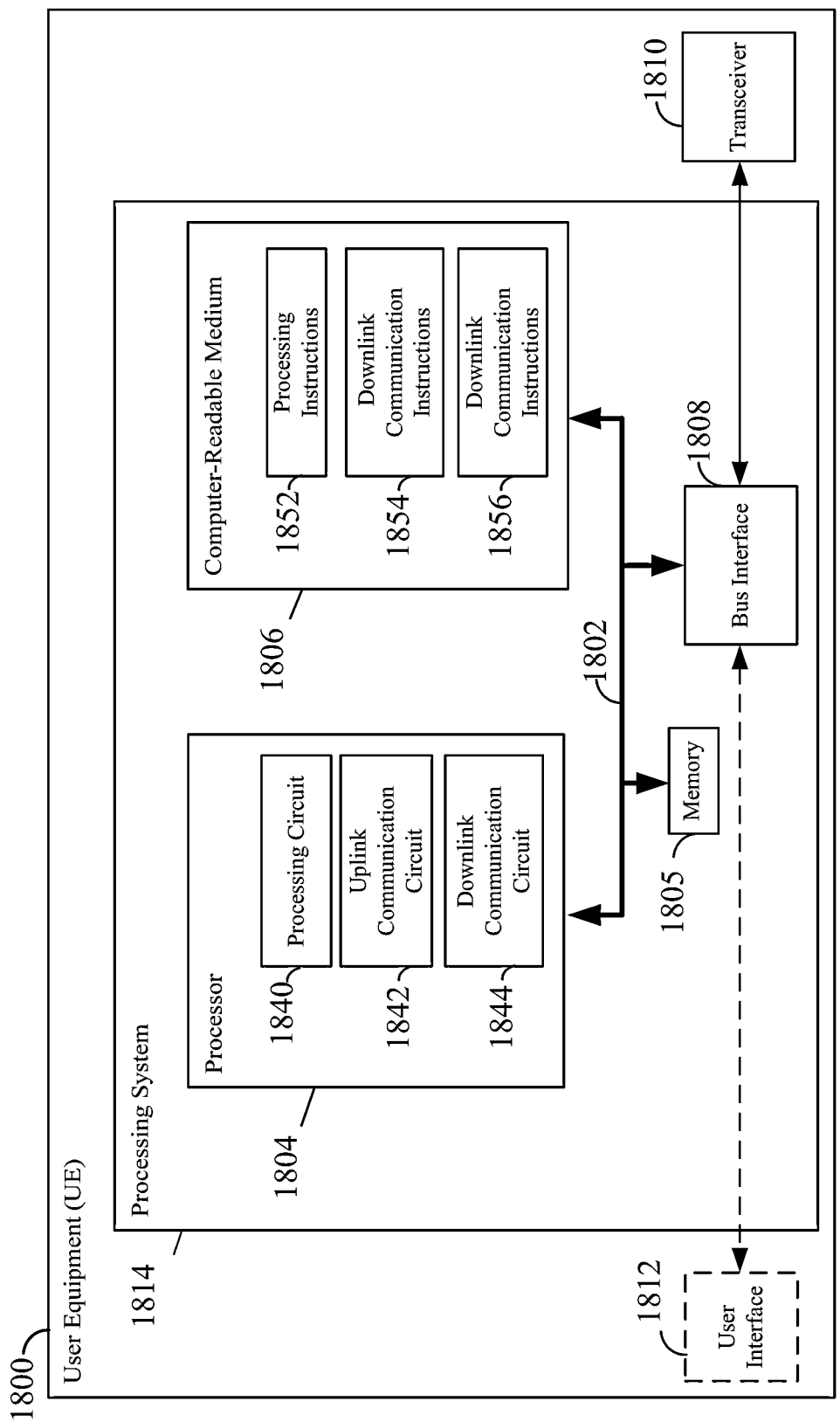
FIG. 18 is a block diagram illustrating an example of a hardware implementation for a UE according to some aspects of the disclosure.

FIG. 18 is a block diagram illustrating an example of a hardware implementation for a UE 1800 employing a processing system 1814. For example, the UE 1800 may be a UE as illustrated in any one or more of FIGS. 1, 2, 3, 4, 18 and/or 21, discussed below, and configured to perform the procedures of FIGS. 5-17, or FIGS. 20 and/or 23-24, discussed below.

The UE 1800 may be implemented with a processing system 1814 that includes one or more processors 1804. Examples of processors 1804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1800 may be configured to perform any one or more of the functions described herein. That is, the processor 1804, as utilized in a UE 1800, may be used to implement any one or more of the processes and procedures described and illustrated in relation to FIGS. 4-10.

In this example, the processing system 1814 may be implemented with a bus architecture, represented generally by the bus 1802. The bus 1802 may include any number of interconnecting buses and bridges depending on the specific application of the processing system 1814 and the overall design constraints. The bus 1802 communicatively couples together various circuits including one or more processors (represented generally by the processor 1804), a memory 1805, and computer-readable media (represented generally by the computer-readable medium 1806). The bus 1802 may also link various other circuits such as timing sources, peripherals, voltage regulators, and power management circuits, which are well known in the art, and therefore, will not be described any further. The bus 1802 may be implemented as a serial bus or parallel bus. A bus interface 1808 provides an interface between the bus 1802 and a transceiver 1810. The transceiver 1810 provides a communication interface or means for communicating with various other apparatus over a transmission medium. Depending upon the nature of the apparatus, a user interface 1812 (e.g., keypad, display, speaker, microphone, joystick, touchscreen) may also be provided. Of course, such a user interface 1812 is optional, and may be omitted in some examples, such as a base station.

In some aspects of the disclosure, the processor 1804 may include circuitry configured for various functions, including, for example, controlling de-sense mitigations. For example, the circuitry may be configured to implement one or more of the functions described in relation to FIGS. 6-17 and FIGS. 20, 23 and 24, discussed below.

For example, the processor 1804 may include a processing circuit 1840, an uplink (UL) communication circuit 1842, and a downlink (DL) communication circuit 1844. The processing circuit 1840 may be configured to perform various data processing, communication, and logic functions in cooperation with or without one or more other components of the UE 1800. In one example, the UE 1800 may use the processing circuit 1840 to schedule and allocate communication resources for UL and DL communications. The UE 1800 may use the UL communication circuit 1842 to perform various UL communication functions with one or more other devices (e.g., a base station). The UE may use the DL communication circuit 1844 to perform various DL communication functions with one or more other devices (e.g., UE).

The processor 1804 is responsible for managing the bus 1802 and general processing, including the execution of software stored on the computer-readable medium 1806. The software, when executed by the processor 1804, causes the processing system 1814 to perform the various functions described below for any particular apparatus. The computer-readable medium 1806 and the memory 1805 may also be used for storing data that is manipulated by the processor 1804 when executing software.

One or more processors 1804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1806. The computer-readable medium 1806 may be a non-transitory computer-readable medium or non-transitory machine-readable storage medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1806 may reside in the processing system 1814, external to the processing system 1814, or distributed across multiple entities including the processing system 1814. The computer-readable medium 1806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1806 may include software configured for various functions, including, for example, interference mitigation. For example, the software may be configured to implement one or more of the functions described above in relation to FIGS. 6-17 or FIGS. 20, 23 and/or 24, discussed below.

For example, the software may include processing instructions 1852, UL communication instructions 1854, and DL communication instructions 1856. The processing instructions when executed by the processor 1804 may perform various data processing, communication, and logic functions in cooperation with or without one or more other components of the UE 1800. The UL communication instructions 1854 when executed by the processor 1804 may perform various UL communication functions with one or more other devices (e.g., a UE). The DL communication instructions 1856 when executed by the processor 1804 may perform various DL communication functions with one or more other devices (e.g., UE).

In some examples, computer-readable medium provides a non-transitory machine-readable storage medium having one or more instructions which when executed by a processing circuit of a UE causes the processing circuit to: control a first transceiver to operate at a first frequency band; control a second transceiver to operate at a second frequency band that overlaps with the first frequency band, the second transceiver radiating at least some signals internally within the UE at the second frequency band; detect interference between the signals radiated internally within the UE at the second frequency the first transceiver of the UE; and control one or more of the first transceiver and the second transceiver to mitigate the interference.

Figure 23:
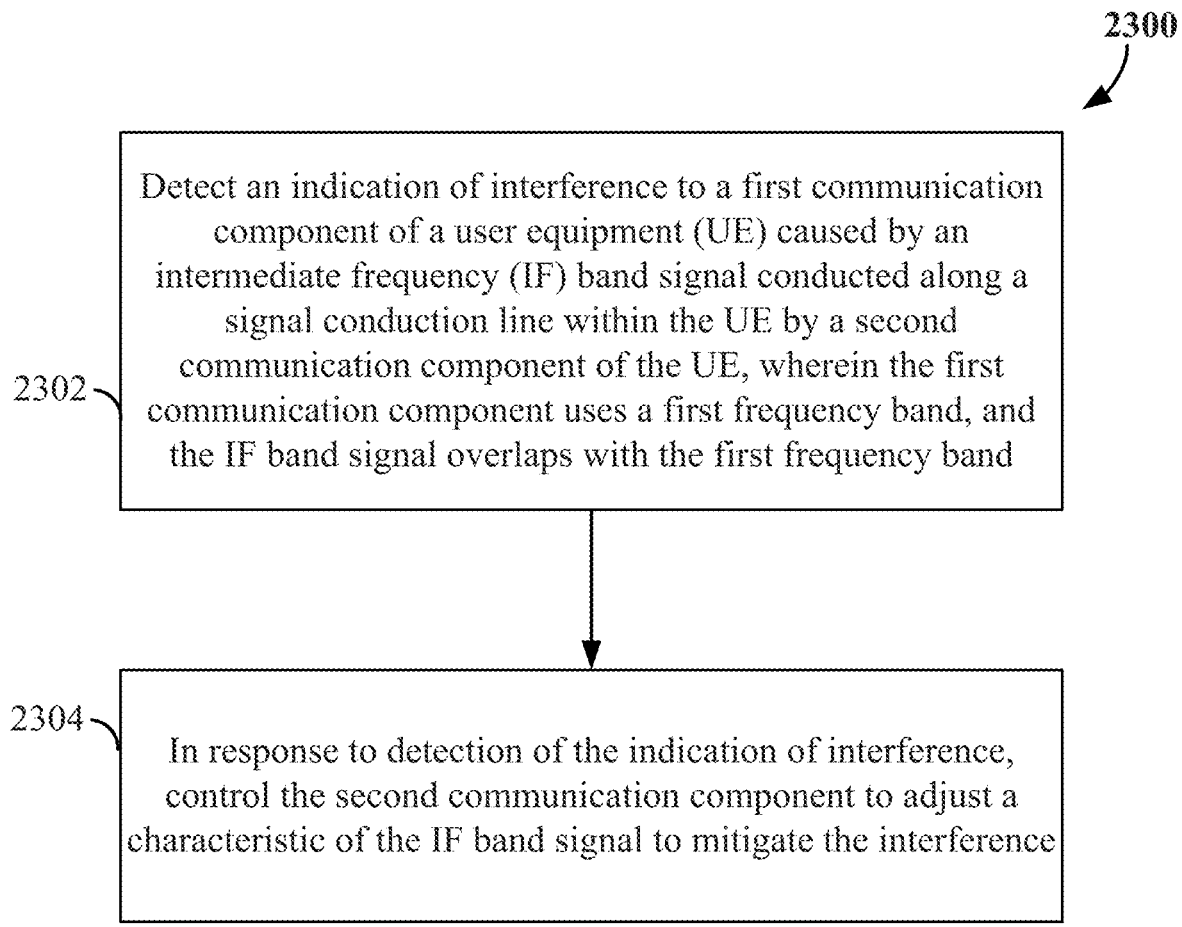
FIG. 23 is a flow chart diagram summarizing mitigation procedures for use by a UE according to some aspects of the disclosure.

Of course, in the above examples, the circuitry included in the processor 1804 is merely provided as an example, and other means for carrying out the described functions may be included within various aspects of the present disclosure, including but not limited to the instructions stored in the computer-readable storage medium 1806, or any other suitable apparatus or means described in any one of the FIGS. 1, 2, 3, and/or 4, and utilizing, for example, the processes and/or algorithms described herein in relation to FIGS. 5-17 and/or FIGS. 20, 23 and/or 24, discussed below.

Figure 19:
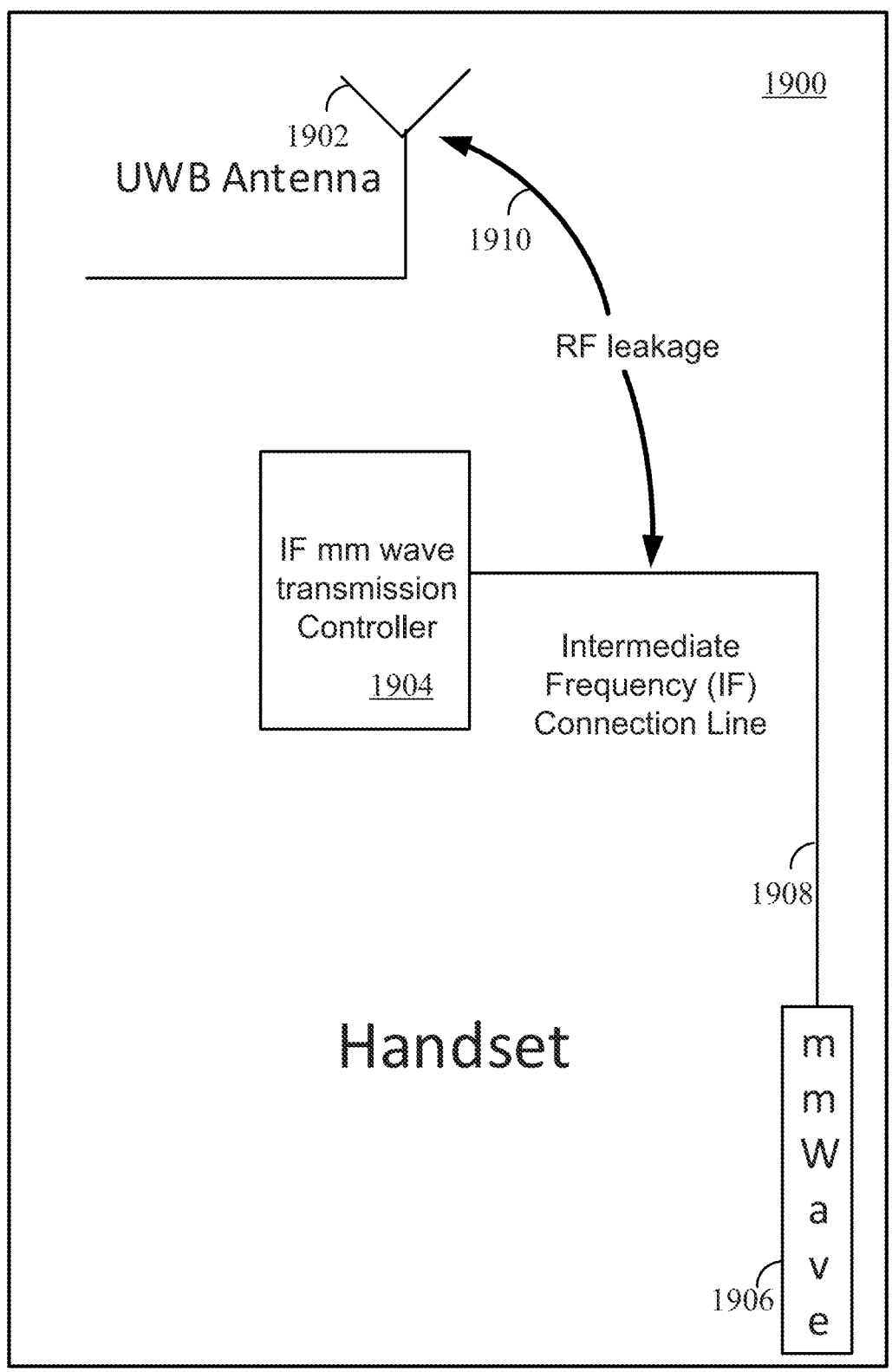
FIG. 19 is another block diagram of an exemplary UE according to some aspects of the disclosure.

FIG. 19 provides an additional illustration of a UE where the UE is a handset 1900 having a UWB antenna 1902 (receiving signals from a UWB signal generator, not shown), an IF mmWave transmission controller 1904 and an mmWave transmission array 1906. A conduction line 1908 is shown along which IF mmWave signals are conducted, some of which radiate (as shown by arrow 1910) resulting in RF leakage that can interfere with the UWB signals and cause a de-sense of the UWB signals. As shown, the leakage can propagate in both directions so that, in some cases, the UWB transmissions are the aggressor transmissions and the IF mmWave transmission are the victim transmissions.

FIG. 20 summarizes an exemplary procedure 2000 in accordance with some aspects of the disclosure for use in a UE for wireless communication that that includes a first communication component (such as a transceiver, receiver or transmitter) configured for use with a first frequency band and a second communication component (such as a transceiver, receiver or transmitter) configured for use with a second frequency band that overlaps with the first frequency band, the second communication component radiating at least some signals at the second frequency band internally within the UE. At block 2002, a processor or other suitable component of the UE detects interference between the signals radiated internally within the UE at the second frequency and the first communication component of the UE and, at block 2004, the processor or other suitable component controls one or more of the first communication component and the second communication component to mitigate the interference. See, for example, the various exemplary interference detection and mitigation procedures described above, especially with reference to FIGS. 6-17 as well as those described in FIGS. 20, 23 and/or 24, discussed below. Note that in many of the examples described above, the first and second communication components are transceivers and each is configured to receive and transmit signals, e.g. each includes both receive and transmit circuits. However, in other examples, either or both of the first and second communication components may be just a receiver or just a transmitter, and one of the first and second communication components might be a transmitter whereas the other is a receiver.

Figure 21:
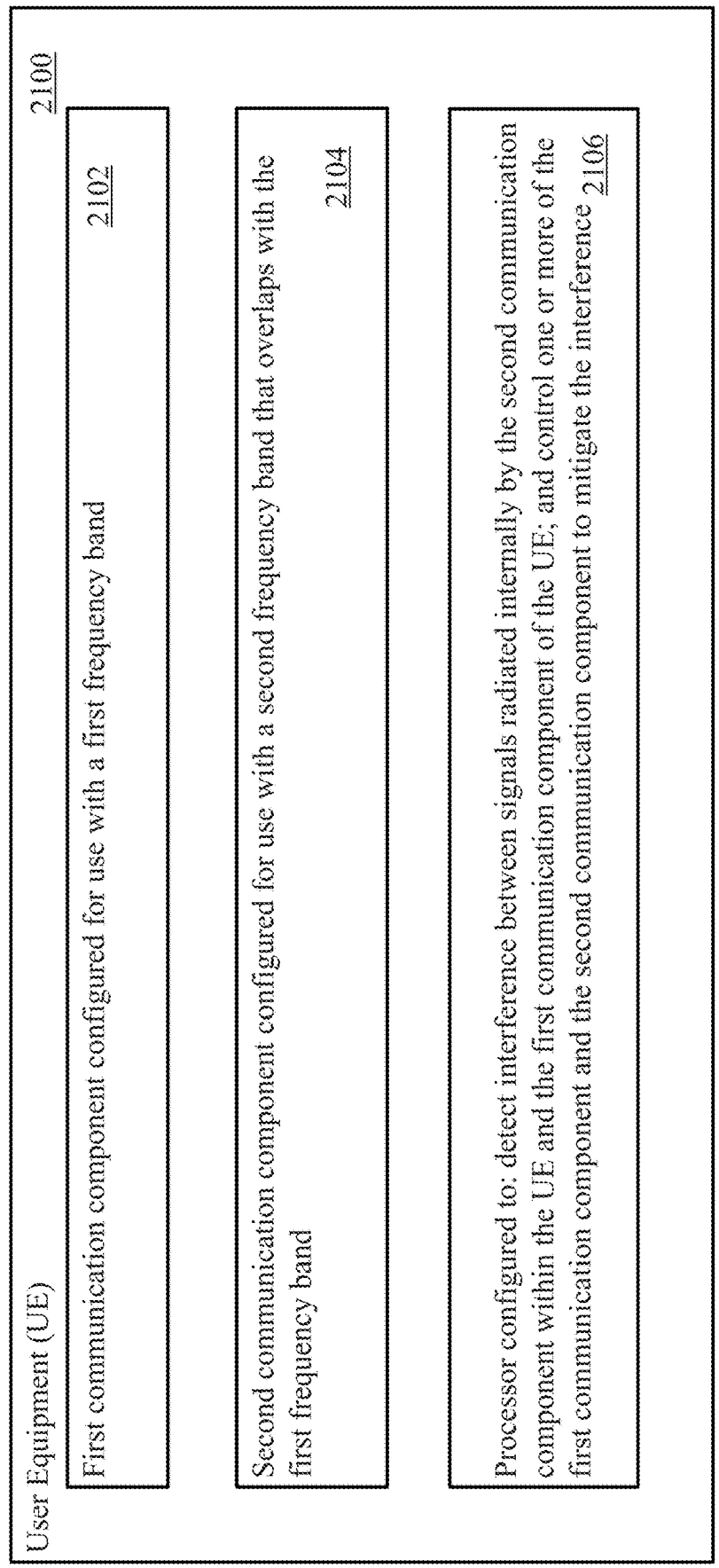
FIG. 21 is a block diagram illustrating exemplary device components according to some aspects of the disclosure.

FIG. 21 is a block diagram illustrating an example of a hardware implementation for a UE 2100. The UE 2100 includes a first communication component 2102 configured for use with a first frequency band and a second communication component 2104 configured for use with a second frequency band that overlaps with the first frequency band. The UE 2100 also includes a processor 2106 configured to: detect interference between the signals radiated internally by the second communication component within the UE and the first communication component of the UE; and control one or more of the first communication component and the second communication component to mitigate the interference. Again, the first and second communication components may be transceivers, each configured to receive and transmit signals, e.g. each includes both receive and transmit circuits. However, in other examples, either or both of the first and second communication components may be just a receiver or just a transmitter, and one of the first and second communication components might be a transmitter whereas the other is a receiver.

In some examples, the first communication component 2102 is a means for receiving or transmitting signals at a first frequency band and the a second communication component 2104 is a means for receiving or transmitting signals at a second frequency band that overlaps with the first frequency band, wherein at least some of the signals at the second frequency band are radiated internally within the UE. The processor provides a means for detecting interference between the signals radiated internally within the UE at the second frequency and the means for receiving or transmitting signals at a first frequency band. The processor also provides a means for mitigating the interference.

FIG. 22 is a block diagram illustrating an example of a processor 2200 of a UE. The exemplary processor may include each of the components shown n FIG. 22 or only a few of the components. The processor 2200 includes a UWB signal generation controller 2202 configured to control the generation of a UWB frequency band signal such as an asset location signal on Channel 9 of the UWB spectrum for transmission via a UWB antenna of the UE to nearby assets such as a key fob or the like. The actual signal may be generated (and modulated) by a UWB transceiver under the control of the processor. A UWB received signal processing controller 2204 is configured to control the processing of a received UWB signal, such as a signal received via the UWB antenna from a nearby asset such as a key fob. This may involve demodulating or decoding the received signal. An IF mmWave UL signal generation controller 2206 is configured to control the generation of an IF mmWave UL signal such as a signal on a frequency that overlaps with Channel 9 of the UWB spectrum for transmission. As noted above, the mmWave transceiver includes components (e.g. component 416 of FIG. 4) configured to take an mmWave IF signal as input and convert it to an mmWave RF signal for output and so the overall mmWave transceiver of the UE includes both RF and IF components. An IF mmWave DL signal processing controller 2208 is configured to control the processing of a received IF mmWave DL signal, such as an IF signal received internally within the IE along the above-described internal IF connection line from a component of the mmWave transceiver that receives RF signals from a wireless communication network and converts the received RF signals to IF signals. This may involve demodulating or decoding the received DL signals.

The processor 2200 may additionally include a WLAN signal generation controller 2210 configured to control the generation of a WLAN signal for transmission to a WLAN such as a WLAN signal on a frequency that overlaps with the UWB spectrum. The actual WLAN signal may be generated by a WLAN transceiver under the control of the processor and output from the UE by a suitable WLAN antenna. A WLAN received signal processing controller 2212 is configured to control the processing of a received WLAN signal, such as a signal received via a WLAN antenna from a nearby WLAN device. A RAT UL signal generation controller 2214 and a RAT DL signal processing controller

2216 may be provided in the UE. As already explained, the RAT UL or DL signals might overlap in some examples with UWB signals.

A UWB signal de-sense/interference detector 2218 is configured to control the detection of a de-sense on of UWB signals and/or control the detection of interference that might cause a de-sense of the UWB signals. In some examples, the UWB signal de-sense/interference detector 2218 is configured to detect the interference or the de-sense using at least one of (a) sensing whether a UWB transceiver is active in a UWB band while the mmWave transceiver is active within a band that overlaps the UWB band (b) receiving a signal from the UWB transceiver indicating that it is active in a UWB band that overlaps with the IF mmWave band and (c) receiving a signal from the UWB transceiver indicating a de-sense of first transceiver signals.

An IF mmWave interference mitigation controller 2220 is configured to control the mitigation of interference with the UWB signal (or de-sensing of the UWB signal) using any of all of the procedures discussed above such as by (a) reducing a transmit power level of the IF mmWave signals, (b) lowering one or more receive signal switchpoints, (c) controlling a DAC of the IF mmWave signal generation controller 2206 to lower output power, (d) reducing a gain of an amplifier of the IF mmWave signal generation controller 2206, (e) reducing a duty-cycle of IF mmWave transmissions and/or (f) change or shift the IF value to avoid an overlap of the IF mmWave signals with the UWB signals. In some examples, the IF mmWave interference mitigation controller 2220 is configured to work with one or more of: an IF mmWave UL signal switchpoint controller or IF shift controller 2222; an IF mmWave UL DAC controller 2224; an IF mmWave UL amplifier gain controller 2226; an IF mmWave UL duty cycle controller 2228; and an IF mmWave UL controller to reduce UWB de-sense to target amount 2230 (such as to some acceptable predetermined amount).

The processor 2200 may additionally include an IF mmWave UL co-existence latency controller 2232 configured to apply mitigation subject to a predetermined latency interval following a detection of an RF coexistence problem between the UWB and mmWave transceivers (or any other pair of transceivers in the UE). A transceiver pair-based mitigation controller 2234 is configured to detect interference associated with a particular pair of transceivers; and control the particular pair of transceivers to mitigate interference associated with the particular pair of transceivers. If the UE is configured to be physically folded and then re-opened, a folded-state mitigation controller 2236 may be provided to control mitigation based on whether the UE is folded or not. A temperature-based mitigation controller 2238 is configured to apply mitigations a temperature of the UE or a temperature of particular components of the UE, such as by increasing mitigations with increasing temperature.

The processor 2200 may additionally include an adaptive (run-time) interference mitigation controller 2240 configured to mitigate interference (or de-sense) by applying one or more adaptive run-time mitigations, of the type described above. In some examples, the adaptive (run-time) interference mitigation controller 2240 is configured to work with one or more of: a metric-based (e.g. native metric) adaptive mitigation controller 2242 and a QoS, RSSI, or SINR detector 2244.

As discussed above, in some examples, the UWB transceiver is the victim and a UWB victim-based mitigation controller 2246 is provided to control and coordinate mitigation procedures for use when the UWB transceiver is the victim. In other examples, the mmWave transceiver is the victim and an mmWave victim-based mitigation controller 2248 is provided to control and coordinate mitigation procedures for use when the mmWave transceiver is the victim. Although not specifically shown, additional components may be provided to control and coordinate mitigation procedures for use when a WLAN transceiver or RAN transceiver is the victim.

In the examples described above, some mitigations involve detecting a noise floor and so, in some examples, the processor 2200 includes a noise floor detection controller 2250 configured to measure a noise floor of the victim transceiver in the absence of transmissions from the victim transceiver and a noise floor-based mitigation controller 2252 configured to adapt mitigations applied to the aggressor transceiver based, in part, on the measure of the noise floor received from the victim transceiver such as by adapt the mitigations to achieve one or more of (a) a target offset for power transmitted by the aggressor transceiver relative to the noise floor and (b) a target de-sense against the victim transceiver based on a signal level of the victim transceiver. Noise floor based mitigations may include activating the aggressor transceiver to permit the victim transceiver to measure the interference noise floor even if the UE has not been configured by an external wireless network for use with the external wireless network in the frequency band of the aggressor transceiver.

In examples where the UE is configured to receive or transmit signals within a plurality of different frequency bands, a frequency band disabling mitigation controller 2254 may be provided that is configured to selectively disable frequency bands that cause a de-sense of a victim transceiver and its frequency band. A LBT-based mitigation controller 2256 may be configured to control a victim transceiver to perform a LBT-type procedure to assess viable frequencies, if any, in the absence of transmissions from the aggressor transceiver. A viable frequency prioritization controller 2258 is configured to prioritize viable frequencies of a victim transceiver based on interference, if any, from an aggressor transceiver, and to control the victim transceiver to transmit using a highest prioritized viable frequency, if one is available, and to transmit at a non-viable frequency only if no viable frequencies are detected.

To assess viable frequencies, a viable frequency database query controller 2260 may be configured to query a database using a location of the UE to identify channels that are viable at the location and to control the mitigation via channel selection based, in part, on the viable channels. For example, if one transceiver is an UWB transceiver and the other transceiver is a WLAN transceiver operating at an overlapping frequency, the processor may query a database using a location of the UE to identify WLAN channels that are viable at the location and control the mitigation via channel selection based, in part, on the viable WLAN channels. As already explained, the database may be an external AFC database provided by the FCC or a downloaded version of an FS databased from FCC ULS. The processor can apply LIF to the viable WLAN channels at the location. As noted above, since some WLAN channels overlap with UWB channels, the list of viable WLAN channels can be converted to a list of viable UWB channels, and LIF can also be applied to the list of viable UWB channels.

Thus, for a device that supports both 6 GHz WLAN and UWB, channel selection for 6 GHz WLAN and UWB may be done in a coordinated manner in order to prevent interference from WLAN to UWB. For example, for a device that supports both 6 GHz WLAN and UWB, and is in US and has the proper authentication/credential to query FCC AFC database, the device can query FCC AFC database to discern if the 6 GHz WLAN channel(s) that overlap with UWB channel 5 are "clean" to "good enough." (The device can also scan for 6 GHz WLAN AP's on these channels as another assessment.) The UWB transceiver can use Channel 5 first instead of Channel 9 if Channel 5 is deemed viable for the UWB application of interest at a given moment in time. The knowledge of clean channels (through AFC) helps prevents interference from high-power fixed services in 6 GHz band to UWB. As noted, the device can also download/obtain/query frequency utilization information of FS from FCC ULS or similar databases for other National Regulatory Authorities (NRA). The information about incumbent FS or other systems can be included through firmware updates as well since the information is not very dynamic. Using this knowledge, the presence of nearby FS can be determined and this information can be used for UWB channel selection to minimize interference from FS.

Other components of the processor 2200 may include a RACH exemption mitigation controller 2262 configured to control transmission of signals for RACH procedures and to exempt RACH signals from mitigations applied to the second transceiver. An adjacent channel-based mitigation controller 2264 is configured to control mitigations based, in part, on channels that are adjacent to channels used by the victim and/or aggressor transceivers. A LIF-based mitigation controller 2266 is configured to use LIF procedures to move a frequency channel employed by the second transceiver away from an overlapping frequency channel of the first transceiver. A LIC-based mitigation controller 2268 configured to use LIC-based procedures across both the frequency of victim transceiver and the frequency the aggressor transceiver. A UWB feedback-based mitigation optimization controller 2270 may be provided to control mitigation based on feedback received from the victim transceiver such as feedback indicating that interference is increasing or decreasing (or de-sense is getting better or worse).

In some examples, the UWB signal de-sense/interference detection controller 2218 provides a means for detecting interference between signals radiated internally within the UE at a second frequency band and a means for receiving or transmitting signals at a first frequency band. The IF mmWave interference mitigation controller 2220 provides a means for mitigating the interference.

FIG. 23 summarizes aspects of the exemplary interference mitigation procedures described above and illustrated, for example, within FIGS. 6-17 and 20. See, also, FIG. 22 and its descriptions, particularly the descriptions of the UWB signal de-sense/interference detector 2218 and the IF mmWave interference mitigation controller 2220. The mitigation procedures 2300 of FIG. 23 may be implemented by the processor of the UE of FIG. 4 or by other suitably equipped or configured processors or components, such as the components of the UEs of FIG. 18 or 21 or the UE processor of FIG. 22, or the UE of FIG. 25, discussed below.

Briefly, at block 2302 of FIG. 23, the processor detects an indication of interference to a first communication component of the UE caused by an intermediate frequency band signal conducted along a signal conduction line within the UE by a second communication component of the UE, wherein the first communication component uses a first frequency band, and the intermediate frequency band signal overlaps with the first frequency band. The first communication component of the UE may be, e.g., the UWB transceiver 402 of FIG. 4 and the second communication component of the UE may be, for example, the mmWave transceiver 404 of FIG. 4 that conducts an IF mmWave band signal on the signal conduction line 414 of FIG. 4. At block 2304, in response to detection of the indication of interference, the processor controls the second communication component to adjust a characteristic of the IF band signal to mitigate the interference.

In some aspects, and as described above with reference, e.g., to FIGS. 7 and 8, the processor detects the indication of interference at block 2302 by (a) receiving an indicator signal from the first communication component (e.g. the UWB transceiver) when it is active transmitting signals in the first communication band to an external device and (b) receiving an indicator signal from the second communication component (e.g. the mmWave transceiver) when it is active communicating signals along the internal signal conduction line. If both the first and second communication components are active, the processor concludes, determines or otherwise detects at block 2302 that interference is likely between the IF band signal (e.g. IF mmWave band signals) and the first communication band signal (e.g. UWB band signals) and controls the second communication device to adjust a characteristic of its IF band signal to mitigate the interference. See, again, FIGS. 7 and 8. Hence, in some aspects, interference is deemed to occur within the UE whenever both the first and second communication components are active. That is, the indication of interference detected by the processor are the signals received from the first and second communication components indicating that both are active.

In this regard, during the characterization phase of a newly-designed UE (such as during characterization of a new model of smartphone), tests may be conducted to determine whether actual interference occurs when the first and second communication components are both active. If actual interference is found to occur during characterization, the UE processors (such as the processors of all UEs of a particular model smartphone being characterized) are programmed or otherwise configured to detect interference whenever both the first and second communication components are active. Hence, in such UEs, detecting the indication of interference is achieved by determining whether the first and second communication components are active at the same time. No further detection procedures are required in that example. On the other hand, if no significant interference is found to occur for a UE design during characterization, the processors of such UEs are instead programmed or otherwise configured to disable the detection of interference. In accordance with that aspect, no interference is deemed to occur within the UE even when both the first and second communication components are active at the same time. Within any UEs where no significant IF band interference is found to occur during characterization, the processor may be designed or configured to omit the IF band interference detection and mitigation feature since, within such UEs, interference arising from the IF band is not a problem.

Thus, in some aspects, the detection of the indication of interference is achieved by determining whether both the first and second communication devices are active at the same time (e.g. concurrently or simultaneously). In other aspects, other procedures may be used to detect the indication of interference. For example, the first communication component may be configured to send the processor an indicator signal whenever it detects or experiences a de-sense. That is, in such devices, the indication of interference is the signal received from the first communication component that a de-sense has occurred. In other examples, a sensor may be installed within the UE to sense the strength of any IF band signals leaked internally within the UE and, if the strength of the lead signals exceeds a threshold, interference is thereby detected. That is, in such devices, the indication of interference is the sensed measure of interference exceeding the threshold.

As noted, once an indication of interference has been detected, the processor controls the second communication component (e.g. the mmWave transceiver) to adjust a characteristic of the IF band signal conducted on the internal signal conduction line to mitigate the interference. In some aspects, as discussed above in connection with FIG. 8, the processor controls the second communication component to mitigate the interference by reducing the signal strength of the IF band signal conducted on the internal signal conduction line. For example, a signal generator of the second communication component (e.g. signal generator 412 of FIG. 4) may be controlled (e.g. by IF mmWave UL amplifier gain controller 2226 of FIG. 22) to reduce the signal strength of the IF signals conducted over the conduction line (e.g. line 414) while the antenna of the second communication component (e.g. antenna, antenna array, or antenna module 416 of FIG. 4) may be controlled (e.g. by RAT UL signal generation gain controller 2214 of FIG. 22) to increase its gain to compensate for the reduced signal strength of the IF band signals it receives.

In this manner, the power of RF signals transmitted from the UE to an external device by the second communication component (e.g. the mmWave transceiver 404) may be the same as if no interference mitigation were performed. In other aspects, the processor controls the second communication component to mitigate the interference by changing the particular frequency of the IF band signal to reduce or eliminate any overlap with the first communication band signals (e.g. the UWB signals). These are just two examples of mitigation procedures and others are discussed elsewhere herein.

Adjustments to the IF band signal (e.g. to its signal strength) to mitigate interference may affect performance metrics of the UE (e.g. KPIs). For example, power consumption within the UE may increase as a result of reducing the IF band signal strength while compensating by increasing the antenna module gain, thus causing a reduction in a power usage efficiency metric of the UE. Alternatively, if the IF band signal strength is reduced without an equivalent increase in the antenna module gain to compensate, then power usage efficiency may be unchanged, but a reduction in QoS of mmWave transmissions may occur. Note that an antenna module (or front end module) of a UE may include an up/downconverter and various gain stages in addition to the antennas themselves. Hence, herein, the gain associated with an antenna of the UE may refer to the gain of one or more components of an antenna module, such as its gain stages, and not necesssarily to the gain of the antenna itself.

As noted above, tradeoffs may be achieved in various performance metrics depending upon whether IF band interference occurs and whether the interference is mitigated. For example, a tradeoff may be achieved between a reduction in power usage efficiency during IF mmWave operation and a decrease in de-sense events for UWB transmissions/receptions. As a practical matter, and as explained above, degrading mmWave performance to mitigate UWB de-sense may be better than blanking the mmWave IF entirely during UWB operation. Accordingly, in some aspects, the provision of mechanisms for detecting and mitigating IF band interference allows for the intelligent selection and control of various tradeoffs in KPIs, as compared to UEs that lack those mechanisms. Some such tradeoffs may be made during the design and development of the UE and others during the operation of the UE, as determined by the operation of the processor or other controller.

Figure 24:
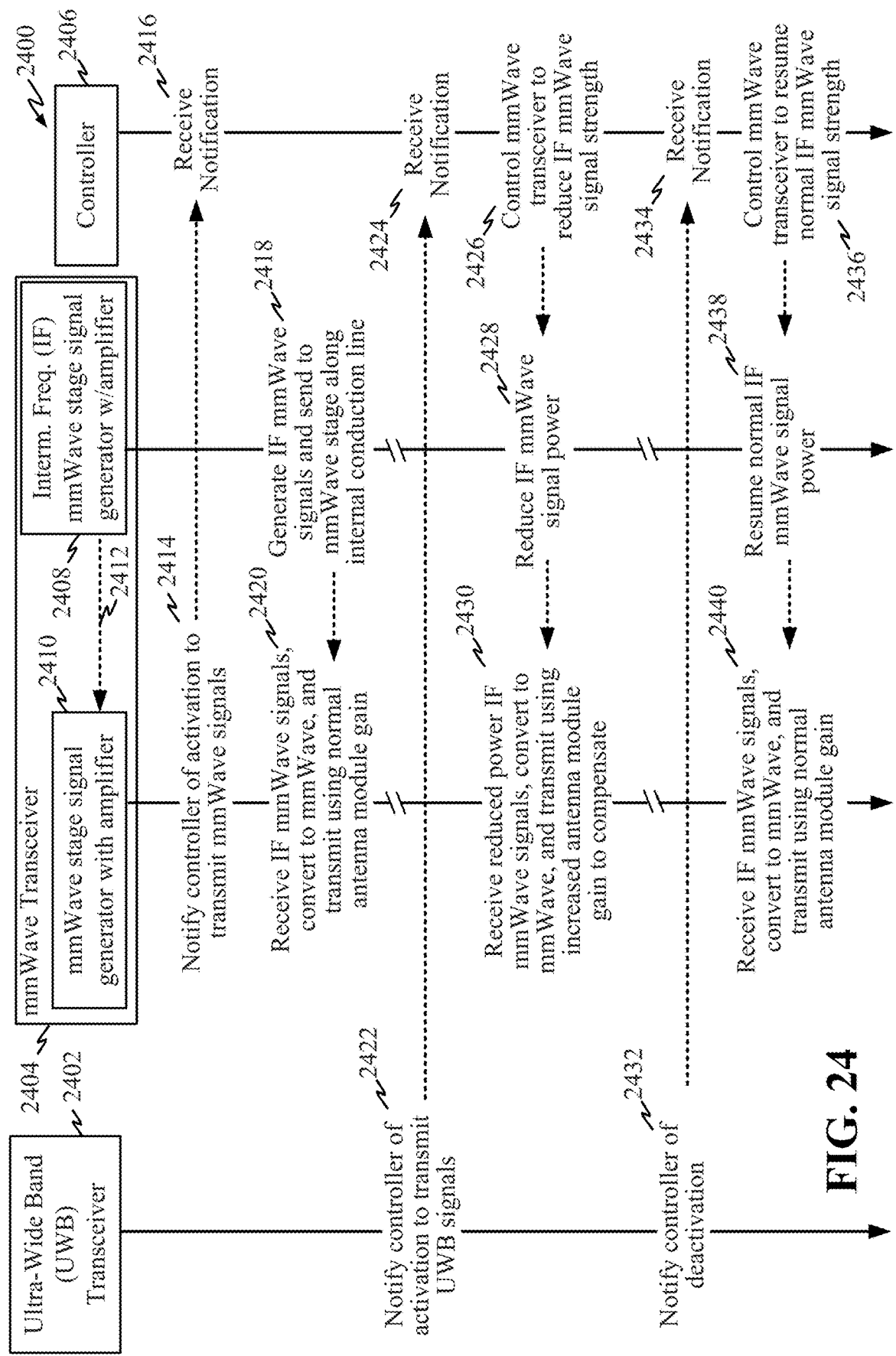
FIG. 24 is a timing diagram summarizing mitigation procedures for use by a UE according to some aspects of the disclosure.

FIG. 24 is a timing diagram illustrating the operation of components of an exemplary UE 2400, which may be the UE of FIG. 4 or other suitably equipped or configured UEs, such the UEs of FIG. 18, 21 or 25, discussed below, or a UE having the processor of FIG. 22. The components of UE 2400 may perform the exemplary interference mitigation procedures described above and illustrated within FIGS. 6-17, 20 and 23, as well as those described in FIG. 24, discussed below. In the example of FIG. 24, interference is mitigated during the transmission of signals to external devices by the UE 2400. That is, an example involving UL transmissions is illustrated. In other examples, interference is mitigated during the reception of signals from external devices by the UE 2400. That is, the procedures described herein are also applicable to DL transmissions (as described above and shown, for example, by way of the various DL components of FIG. 22).

Within FIG. 24, the UE 2400 includes a UWB transceiver 2402 (e.g. UWB transceiver 402 of FIG. 4), a mmWave transceiver 2404 (e.g. mmWave transceiver 404 of FIG. 4), and a controller or processor 2406 (e.g., processor 420 of FIG. 4). As shown, the mmWave transceiver 2404 includes an IF mmWave stage signal generator 2408 (e.g. IF mmWave generator 412 of FIG. 4 or IF mmWave UL signal generation controller 2206 of FIG. 22) and an mmWave stage signal transmitter 2410 (e.g. mmWave antenna array 416 of FIG. 4 or RAT UL signal generator controller 2214 of FIG. 22). The IF mmWave stage signal generator 2408 and the mmWave stage signal transmitter 2410 are interconnected by a signal conduction line 2412 (e.g. line 414 of FIG. 4), which may be a coaxial signal transmission line formed on a circuit within the UE.

In the scenario of FIG. 24, beginning at 2414, the mmWave transceiver 2404 notifies the controller 2406 that it has been activated to transmit mmWave signals to an external device, such as a local base station. In one particular example, this may occur after the user takes the UE out of airplane mode so that a previously disabled mmWave transceiver may begin operating again to communicate with a local base station.

At 2416, the controller 2406 receives and records the notification. Thereafter, commencing at 2418, the IF mmWave stage signal generator 2408 generates IF signals, which are conducted along the internal conduction line 2412 to the mmWave stage of the transceiver 2404 for amplification and transmission as mmWave signals to an external device such as a base station. This may involve up-converting the IF signals to higher frequency mmWave transmission signals within the mmWave band. Note that when the IF signals are fed onto the internal conduction line 2412, the IF signals may be sent using a normal or default signal strength. For example, a normal or default amplifier gain may be applied to an amplifier of the IF stage (using, e.g., IF mmWave amplifier gain controller 2226 of FIG. 22). The normal or default amplifier gain may be whatever gain level would be used in the absence of interference mitigation. Then, after the IF signals are up-converted to a higher frequency mmWave by mmWave stage signal generator 2410, the mmWave signals are transmitted using an antenna module of the mmWave transceiver 2402 (such as by using the antenna or antenna array 416 of FIG. 4). The gain of an amplifier of antenna module may be set to a normal or default level or gain (e.g. the gain level that would be used in the absence of interference mitigation).

Later, at 2422, the UWB transceiver 2402 is activated to communicate with a device in the vicinity of the UE (such as an IoT device). This activation may occur, for example, because the user of the UE has activated an app that effectuates the communication with the IoT device. A notification is sent by the UWB transceiver 2402 at 2422 and is received by the controller 2406 at 2424, which records the notification. Therefore, at 2426, the controller knows that both of the mmWave transceiver 2404 and the UWB transceiver 2402 are now active. This serves as the detection of an indication of interference (as discussed above).

Accordingly, at 2426, the controller 2406 sends a control signal to the IF mmWave stage signal generator 2408 of the mmWave transceiver 2404 to reduce the IF signal strength of signals transmitted on the internal signal conduction interconnection line 2412. At 2428, the IF mmWave stage signal generator 2408 responds by reducing the gain of its amplifier by some amount, which may be a predetermined amount specified following device characterization and stored in a look-up table within the UE. See, the db reduction examples described above. The mmWave stage signal generator 2410 then receives the IF signals at 2430 and up-converts the signals to higher mmWave frequencies for transmission.

To compensate for the reduced signal power on the internal conduction line 2412, the mmWave stage signal generator 2410 increases the gain of its antenna module to either partially or fully compensate for the reduction in signal strength of the IF mmWave signal. If the antenna gain is increased by an amount sufficient to completely compensate for the reduction in signal strength of the IF mmWave signal, then the output power of the mmWave transceiver 2404 will be the same as previously transmitted at 2420, but any interference between leaked IF mmWave signals along line 2412 (radiated internally within the UE) and the UWB transceiver 2402 will be mitigated or eliminated. If the antenna gain is increased by an amount to partially compensate for the reduction in signal strength of the IF mmWave signal, then the output power of the mmWave transceiver 2404 will be reduced as compared to that previously transmitted at 2420, but any interference between leaked IF mmWave signals along line 2412 (radiated internally within the UE) and the UWB transceiver 2402 will be mitigated or eliminated.

In the scenario of FIG. 24, at a later time, UWB transceiver 2402 is deactivated, perhaps because the user is no longer using an app that requires the UWB transceiver 2402, and so a suitable notification is sent to the controller 2406, which is received and recorded at 2434. At that time, the controller 2406 then knows that the UWB transceiver 2402 is no longer operating at the same time as the mmWave transceiver 2404 and so interference by the IF mmWave signals along internal conduction line 2412 are no longer a significant concern. Accordingly, the controller 2406 at 2436 sends a control signal to the mmWave transceiver 2404 indicating that it should resume its normal IF mmWave stage operations. The control signal is received at 2438. The IF mmWave stage signal generator 2408 then resumes using its normal or default amplifier gain and sends IF mmWave signals along line 2412 using normal or default power. At 2440, the mmWave stage signal generator 2410 receives the IF mmWave signals and up-converts the signals to a higher frequency for transmission, and then transmits the signals using its normal or default antenna module gain.

In this manner, mitigation procedures for mitigating interference between IF band signals leaked from internal line 2412 to the UWB transceiver 2402 are activated and deactivated as appropriate under the control of the controller 2406. As can be appreciated, FIG. 24 provides just one illustrative example of the operation of these components. In other examples, the UWB transceiver 2402 may be activated before the mmWave transceiver 2404, or both might be activated at the same time, with one then deactivated before the other. In any such scenarios, whenever both transceivers are operating at the same time, the controller 2406 deems that to be an indication of likely interference and takes actions to mitigate the interference. As already explained, in other examples, other mechanisms or procedures may be implemented for allowing the controller or processor 2406 to detect some indication of interference, such as by receiving a signal from the UWB transceiver 2402 that it has experienced a de-sense, or, if the UE 2400 is equipped with a suitable internal sensor, by receiving signals measured by the sensor of an amount of IF signal leakage within the UE, which may be compared against the threshold to detect the indication of interference. Moreover, as already explained, other characteristics of the IF mmWave signal may be adjusted or controlled to mitigate interference, such as its frequency.

Figure 25:
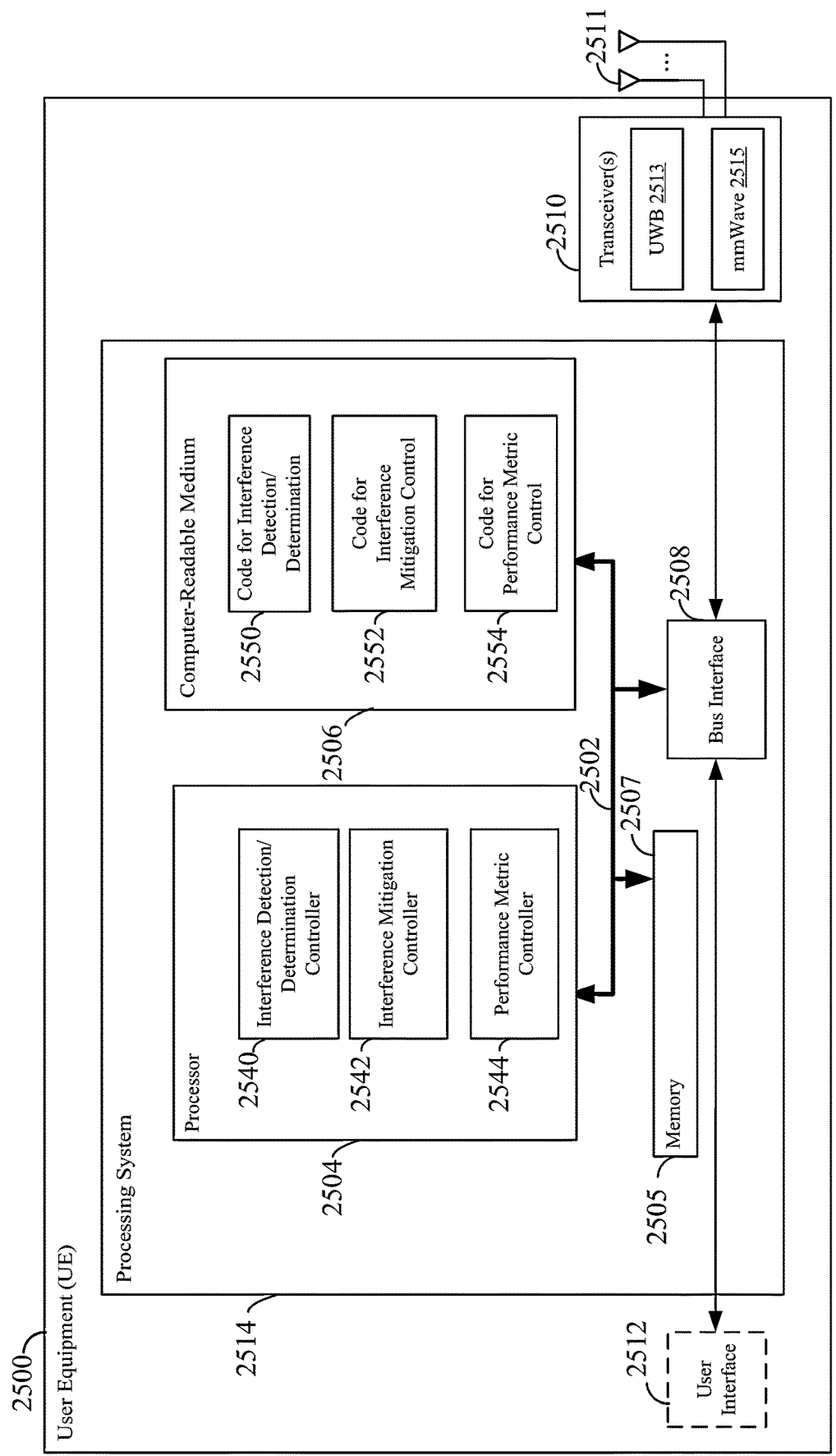
FIG. 25 is a block diagram illustrating an example of a hardware implementation for a UE according to some aspects of the disclosure.

FIG. 25 is a conceptual diagram illustrating an example of a hardware implementation for an exemplary UE 2500 employing a processing system 2514. In accordance with various aspects, an element, or any portion of an element, or any combination of elements may be implemented with a processing system 2514 that includes one or more processors 2504. For example, the UE 2500 may be a UE as illustrated in any one or more of FIGS. 1, 2, 3, 4, and/or 21 and configured to perform the procedures of FIGS. 5-17, 20, 23 and/or 24.

The processing system 2514 may be substantially the same as the processing system 2514 illustrated in FIG. 18, including a bus interface 2508, a bus 2502, memory 2505, a processor 2504, and a computer-readable medium 2506. Furthermore, the UE 2500 may include a user interface 2512 and a transceivers 2510 including a UWB transceiver 2513 and an mmWave transceiver 2515. The transceivers 2510 may be connected to respective antennas, antenna arrays, or antenna modules 2511. The transceivers 2510 may each include separate receive and transmit RF components or RF component chains not separately shown, as well as IF stage components, as described above.

Depending upon the nature of the apparatus, the user interface 2512 may include, e.g., a keypad, display, speaker, microphone, joystick, etc. The user interface 1512 is optional and may be omitted in some examples.

In some aspects, the processor 2504 may include circuitry configured for various functions, including, for example, the detection and mitigation of interference. For example, the circuitry may be configured to implement one or more of the UE functions described in relation to FIGS. 1, 2, 3, 4, and/or 21 and configured to perform the interference mitigation procedures of FIGS. 5-17, 20, 23 and/or 24.

The processor 2504 may include an interference detection/determination controller 2540 configured to detect an indication of interference to a first communication component (e.g. UWB transceiver 2513) caused by an intermediate frequency band signal conducted along an internal signal conduction line (not shown in FIG. 25) of a second communication component (e.g. the mmWave transceiver 2515). In some examples, the detection of the indication if interference may be based on signals received from the UWB transceiver 2513 and the mmWave transceiver 2515 indicating that both are active at the same time. If both are active, interference is presumed. If either transceiver is not active, then no interference is deemed to be presently occurring.

The processor 2504 may also include an interference mitigation controller 2542 configured to operate, in response to the indication of interference, to control the second communication component (e.g. mmWave transceiver 2515) to adjust a characteristic of the intermediate frequency band signal to mitigate the interference, as already explained.

The processor 2504 may also include a performance metric controller 2544 configured to control the measurement of various KPIs or other performance metrics and to adjust the interference to, e.g., mitigate the interference based on a performance metric to provide a first level of the performance metric during the interference that differs from a second level of the performance metric occurring in the absence the interference. The performance metric controller 2544 may also be configured to a second communication component (e.g. mmWave transceiver 2515) to adjust the characteristic of the intermediate frequency band signal to mitigate the interference by applying an adjustment that provides a trade-off between a first performance metric (such as a value representative of intermediate frequency mmWave performance) and a second performance metric (such as a value representative of de-sense avoidance in a first frequency band, e.g. UWB). See, also, the various performance metric components illustrated in FIG. 22.

The processor 2504 is responsible for managing the bus 2502 and general processing, including the execution of software stored on the computer-readable medium 2506. The software, when executed by the processor 2504, causes the processing system 2514 to perform the various functions described below for any particular apparatus. The computer-readable medium 2506 and the memory 2505 may also be used for storing data that is manipulated by the processor 2504 when executing software. For example, software code or instructions may be configured to implement one or more of the functions described in relation to FIGS. 5-17, 20, 23 and/or 24.

The computer-readable medium 2506 may include code or instructions 2550 for controlling interference detection and determination such as detecting an indication of interference to a first communication component (e.g. UWB transceiver 2513) caused by an intermediate frequency band signal conducted along an internal signal conduction line (not shown in FIG. 25) of a second communication component (e.g. the mmWave transceiver 2515).

The computer-readable medium 2506 may also include code or instructions 2552 for controlling interference mitigation such as by, in response to the indication of interference, controlling the second communication component (e.g. mmWave transceiver 2515) to adjust a characteristic of the intermediate frequency band signal to mitigate the interference.

The computer-readable medium 2506 may also include code or instructions 2554 for controlling performance metrics such as by controlling the measurement of various KPIs or other performance metrics and adjusting the interference to, e.g., mitigate the interference based on a performance metric to provide a first level of the performance metric during the interference that differs from a second level of the performance metric occurring in the absence the interference.

Note that the circuitry included in the processor 2504 is merely provided as an example, and other means for carrying out the described functions may be included within various aspects of the present disclosure, including but not limited to the instructions stored in the computer-readable storage medium 2506, or any other suitable apparatus or means described in any one of the FIGS. 1, 2, 3, 4, and/or 21, and utilizing, e.g., the processes and/or algorithms described herein in relation to FIGS. 5-17, 20, 23 and/or 24.

In some aspects, the UWB transceiver 2513 provides a means for communicating signals using a first frequency band. In some aspects, the mmWave transceiver 2515 provides a means for generating an intermediate frequency band signal, the intermediate frequency band overlapping with the first frequency band. In some aspects, the internal conduction line (e.g. line 414) provides a means for conducting the intermediate frequency band signal internally within the UE. In some aspects, the interference detection/determination controller 2540 provides a means for detecting an indication of interference within a means for communicating signals using a first frequency band (e.g. UWB transceiver 2513) caused by a means for conducting the intermediate frequency band signal (e.g. mmWave transceiver 2515). In some aspects, the interference mitigation controller 2542 provides a means, operative in response to the indication of interference, for adjusting the intermediate frequency band signal to mitigate the interference.

The following provides an overview of examples of the present disclosure.

Example 1

A user equipment (UE) for wireless communication is provided that comprises: a first communication component configured to use a first frequency band; a second communication component configured to use an intermediate frequency band to conduct a signal along a signal conduction line within the UE, the intermediate frequency band overlapping with the first frequency band; and a processor configured to: detect an indication of interference to the first communication component caused by the intermediate frequency band signal conducted along the signal conduction line; and in response to the indication of interference, control the second communication component to adjust a characteristic of the intermediate frequency band signal to mitigate the interference.

Example 2 the UE of example 1, wherein the first communication component is configured to use an ultra-wide band frequency band as the first frequency band and wherein the second communication component is configured to use an intermediate frequency millimeter wave frequency band as the intermediate frequency band.

Example 3

The UE of examples 1 or 2, wherein the processor is configured to detect the indication of interference using at least one of: (a) sensing whether the first communication component is active in the first frequency band while the second communication component is active within the intermediate frequency band, (b) receiving a signal from the first communication component indicating that the first communication component is active while the second communication component is active within the intermediate frequency band, or (c) receiving a signal from the first communication component indicating a signal de-sense.

Example 4 the UE of examples 1, 2, or 3, wherein the second communication component comprises an intermediate frequency band signal generator and an antenna, with the signal conduction line interconnecting the signal generator and the antenna.

Example 5 the UE of example 4, wherein the processor is further configured to control the second communication component to reduce a signal strength of the intermediate frequency band signal conducted on the signal conduction line in response to the indication of interference.

Example 6 the UE of example 5, wherein the processor is further configured to (a) reduce an output power of the intermediate frequency signal generator and (b) increase a gain associated with the antenna in response to the indication of interference.

Example 7 the UE of example 6, wherein the processor is further configured to control the second communication component to increase the gain by an amount to compensate for the reduction in the output power of the intermediate frequency signal generator.

Example 8 the UE of examples 1, 2, 3, 4, 5, 6, or 7, wherein the second communication component further comprises components for converting the intermediate frequency signal conducted along the signal conduction line from the intermediate frequency band to a second frequency band for transmission from the UE, wherein the second frequency band is higher than the intermediate frequency band.

Example 9 the UE of examples 1, 2, 3, 4, 5, 6, 7, or 8, wherein the processor is further configured to control the second communication component to adjust a frequency of the intermediate frequency band signal in response to the indication of interference.

Example 10 the UE of examples 1, 2, 3, 4, 5, 6, 7, 8, or 9, wherein the first communication component is a radio access technology (RAT) transceiver and the second communication component is an millimeter wave transceiver.

Example 11 the UE of examples 1, 2, 3, 4, 5, 6, 7, 8, 9, or 10, wherein the UE includes a plurality of pairs of first and second communication components, and wherein the processor is configured to detect an indication of interference associated with a particular pair of first and second communication components; and control the second communication component of the particular pair of first and second communication components to mitigate interference associated with the particular pair of first and second communication components.

Example 12 the UE of examples 1, 2, 3, 4, 5, 6, 7, 8, 9, 10, or 11, wherein the processor is further configured to control the second communication component to adjust the characteristic of the intermediate frequency band signal to mitigate the interference based on a performance metric to provide a first level of the performance metric during the interference that differs from a second level of the performance metric occurring in the absence the interference.

Example 13 the UE of example 1, wherein the processor is further configured to adjust the characteristic of the intermediate frequency band signal based on a trade-off between a first performance metric and a second performance metric in response to the indication of interference.

Example 14 the UE of example 13, wherein the processor is configured to use a value representative of intermediate frequency millimeter wave performance as the first performance metric and to use a value representative of de-sense avoidance as the second performance metric.

Example 15 the UE of examples 1, 2, 3, 4, 5, 6, 7, 8, 9, 10, 11, 12, 13, or 14, wherein the first communication component includes a component configured to measure a noise floor in an absence of transmissions from the first communication component and to send a measure of the noise floor to the processor; and wherein the processor is further configured to control the second communication component to adjust the characteristic of the intermediate frequency band signal based, at least in part, on the measure of the noise floor.

Example 16 the UE of example 15, wherein the processor is further configured to control the second communication component to adjust the characteristic of the intermediate frequency band signal to achieve at least one of (a) a target offset for power transmitted by the second communication component relative to the noise floor and (b) a target de-sense against the first communication component based on a signal level of the first communication component.

Example 17 the UE of examples 1, 2, 3, 4, 5, 6, 7, 8, 9, 10, 11, 12, 13, 14, 15, or 16, wherein the second communication component is configured to conduct the intermediate frequency band signal along the signal conduction line using plurality of different frequencies and wherein the processor is configured to selectively disable one or more particular frequencies that cause a de-sense of the first communication component and its first frequency band.

Example 18 a method for use by a user equipment (UE) for wireless communication is provided wherein the method comprises: detecting an indication of interference to a first communication component of the UE caused by an intermediate frequency band signal conducted along a signal conduction line within the UE by a second communication component of the UE, wherein the first communication component uses a first frequency band and the intermediate frequency band signal overlaps with the first frequency band; and, in response to the indication of interference, adjusting the intermediate frequency band signal to mitigate the interference.

Example 19 the method of example 18, wherein the first frequency band is an ultra-wide band (UWB) frequency band and the intermediate frequency (IF) band is an IF millimeter wave (mmWave) frequency band.

Example 20 the method of examples 18 or 19, wherein detecting the indication of interference comprises at least one of: (a) sensing whether the first communication component is active in the first frequency band while the second communication component is active within the intermediate frequency band, (b) receiving a signal from the first communication component indicating that the first communication component is active while the second communication component is active within the intermediate frequency band, or (c) receiving a signal from the first communication component indicating a signal de-sense.

Example 21 the method of examples 18, 19, or 20, wherein the second communication component comprises an intermediate frequency band signal generator and an antenna, with the signal conduction line interconnecting the signal generator and the antenna; and wherein adjusting the intermediate frequency band signal comprises reducing a signal strength of the intermediate frequency band signal conducted on the signal conduction line in response to the indication of interference.

Example 22 the method of example 21, wherein reducing the signal strength of the intermediate frequency band signal conducted on the signal conduction line comprises (a) reducing an output power of the intermediate frequency signal generator and (b) increasing a gain associated with the antenna in response to the indication of interference.

Example 23 the method of example 22, wherein the gain is increased by an amount to compensate for the reduction in the output power of the intermediate frequency signal generator.

Example 24 the method of examples 18, 19, 20, 21, 22 or 23, further comprising converting the intermediate frequency signal conducted along the signal conduction line from the intermediate frequency band to a second frequency band for transmission from the UE, wherein the second frequency band is higher than the intermediate frequency band.

Example 25 the method of examples 18, 19, 20, 21, 22, 23, or 24, wherein adjusting the intermediate frequency band signal to mitigate the interference comprises adjusting a frequency of the intermediate frequency band signal in response to the indication of interference.

Example 26 the method of examples 18, 19, 20, 21, 22, 23, 24, or 25, wherein adjusting the intermediate frequency band signal to mitigate the interference is performed based on a performance metric to provide a first level of the performance metric during the interference that differs from a second level of the performance metric occurring in an absence the interference.

Example 27 the method of examples 18, 19, 20, 21, 22, 23, 24, 25, or 26, wherein the characteristic of the intermediate frequency band signal is adjusted based on a trade-off between a first performance metric and a second performance metric in response to the indication of interference.

Example 28 the method of example 27, wherein the first performance metric comprises a value representative of intermediate frequency millimeter performance and the second performance metric comprises a value representative of de-sense avoidance.

Example 29 an apparatus for wireless communication is provided wherein the apparatus comprises: means for communicating signals using a first frequency band; means for generating an intermediate frequency band signal, the intermediate frequency band overlapping with the first frequency band; means for conducting the intermediate frequency band signal internally within the apparatus; means for detecting an indication of interference with the means for communicating signals using a first frequency band caused by the means for conducting the intermediate frequency band signal; and means, operative in response to the indication of interference, for adjusting the intermediate frequency band signal to mitigate the interference.

Example 30 a non-transitory machine-readable storage medium is provided having one or more instructions which when executed by a processing circuit of a user equipment (UE) causes the processing circuit to: communicate signals to an external device using a first frequency band; generate an intermediate frequency band signal, the intermediate frequency band overlapping with the first frequency band; conducting the intermediate frequency band signal internally within the UE; detecting an indication of interference with the signals communicated using the first frequency band caused by the intermediate frequency band signals; and in response to the indication of interference, adjusting the intermediate frequency band signal to mitigate the interference.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-25 may be rearranged and/or combined into a single component, step, feature or function or embodied in several components, steps, or functions. Additional elements, components, steps, and/or functions may also be added without departing from features disclosed herein. The apparatus, devices, and/or components illustrated in FIGS. 1-25 may be configured to perform one or more of the methods, features, or steps described herein. The algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A user equipment (UE) for wireless communication, comprising:
    a first communication component configured to use a first frequency band;
    a second communication component configured to use an intermediate frequency band to conduct a signal along a signal conduction line within the UE, the intermediate frequency band overlapping with the first frequency band; and
    a processor configured to:
        detect an indication of interference to the first communication component caused by the intermediate frequency band signal conducted along the signal conduction line; and
        in response to the indication of interference, control the second communication component to adjust a characteristic of the intermediate frequency band signal to mitigate the interference.

2. The UE of claim 1, wherein the first communication component is configured to use an ultra-wide band frequency band as the first frequency band and wherein the second communication component is configured to use an intermediate frequency millimeter wave frequency band as the intermediate frequency band.

3. The UE of claim 1, wherein the processor is configured to detect the indication of interference using at least one of: (a) sensing whether the first communication component is active in the first frequency band while the second communication component is active within the intermediate frequency band, (b) receiving a signal from the first communication component indicating that the first communication component is active while the second communication component is active within the intermediate frequency band, or (c) receiving a signal from the first communication component indicating a signal de-sense.

4. The UE of claim 1, wherein the second communication component comprises an intermediate frequency band signal generator and an antenna, with the signal conduction line interconnecting the signal generator and the antenna.

5. The UE of claim 4, wherein the processor is further configured to control the second communication component to reduce a signal strength of the intermediate frequency band signal conducted on the signal conduction line in response to the indication of interference.

6. The UE of claim 5, wherein the processor is further configured to (a) reduce an output power of the intermediate frequency signal generator and (b) increase a gain associated with the antenna in response to the indication of interference.

7. The UE of claim 6, wherein the processor is further configured to control the second communication component to increase the gain by an amount to compensate for the reduction in the output power of the intermediate frequency signal generator.

8. The UE of claim 1, wherein the second communication component further comprises components for converting the intermediate frequency signal conducted along the signal conduction line from the intermediate frequency band to a second frequency band for transmission from the UE, wherein the second frequency band is higher than the intermediate frequency band.

9. The UE of claim 1, wherein the processor is further configured to control the second communication component to adjust a frequency of the intermediate frequency band signal in response to the indication of interference.

10. The UE of claim 1, wherein the first communication component is a radio access technology (RAT) transceiver and the second communication component is a millimeter wave transceiver.

11. The UE of claim 1, wherein the UE includes a plurality of pairs of first and second communication components, and wherein the processor is further configured to:
  detect an indication of interference associated with a particular pair of first and second communication components; and
  control the second communication component of the particular pair of first and second communication components to mitigate interference associated with the particular pair of first and second communication components.

12. The UE of claim 1, wherein the processor is further configured to control the second communication component to adjust the characteristic of the intermediate frequency band signal to mitigate the interference based on a performance metric to provide a first level of the performance metric during the interference that differs from a second level of the performance metric occurring in an absence the interference.

13. The UE of claim 1, wherein the processor is further configured to adjust the characteristic of the intermediate frequency band signal based on a trade-off between a first performance metric and a second performance metric in response to the indication of interference.

14. The UE of claim 13, wherein the processor is configured to use a value representative of intermediate frequency millimeter wave performance as the first performance metric and to use a value representative of de-sense avoidance as the second performance metric.

15. The UE of claim 1,
  wherein the first communication component includes a component configured to measure a noise floor in an absence of transmissions from the first communication component and to send a measure of the noise floor to the processor; and
  wherein the processor is further configured to control the second communication component to adjust the characteristic of the intermediate frequency band signal based, at least in part, on the measure of the noise floor.

16. The UE of claim 15, wherein the processor is further configured to control the second communication component to adjust the characteristic of the intermediate frequency band signal to achieve at least one of (a) a target offset for power transmitted by the second communication component relative to the noise floor or (b) a target de-sense against the first communication component based on a signal level of the first communication component.

17. The UE of claim 1, wherein the second communication component is configured to conduct the intermediate frequency band signal along the signal conduction line using a plurality of different frequencies and wherein the processor is configured to selectively disable one or more particular frequencies that cause a de-sense of the first communication component and its first frequency band.

18. A method for use by a user equipment (UE) for wireless communication, the method comprising:
  detecting an indication of interference to a first communication component of the UE caused by an intermediate frequency band signal conducted along a signal conduction line within the UE by a second communication component of the UE, wherein the first communication component uses a first frequency band and the intermediate frequency band signal overlaps with the first frequency band; and
  in response to the indication of interference, adjusting the intermediate frequency band signal to mitigate the interference.

19. The method of claim 18, wherein the first frequency band is an ultra-wide band (UWB) frequency band and the intermediate frequency (IF) band is an IF millimeter wave (mmWave) frequency band.

20. The method of claim 18, wherein detecting the indication of interference comprises at least one of: (a) sensing whether the first communication component is active in the first frequency band while the second communication component is active within the intermediate frequency band, (b) receiving a signal from the first communication component indicating that the first communication component is active while the second communication component is active within the intermediate frequency band, or (c) receiving a signal from the first communication component indicating a signal de-sense.

21. The method of claim 18,
  wherein the second communication component comprises an intermediate frequency band signal generator and an antenna, with the signal conduction line interconnecting the signal generator and the antenna; and
  wherein adjusting the intermediate frequency band signal comprises reducing a signal strength of the intermediate frequency band signal conducted on the signal conduction line in response to the indication of interference.

22. The method of claim 21, wherein reducing the signal strength of the intermediate frequency band signal conducted on the signal conduction line comprises (a) reducing an output power of the intermediate frequency signal generator and (b) increasing a gain associated with the antenna in response to the indication of interference.

23. The method of claim 22, wherein the gain is increased by an amount to compensate for the reduction in the output power of the intermediate frequency signal generator.

24. The method of claim 18, further comprising converting the intermediate frequency signal conducted along the signal conduction line from the intermediate frequency band to a second frequency band for transmission from the UE, wherein the second frequency band is higher than the intermediate frequency band.

25. The method of claim 18, wherein adjusting the intermediate frequency band signal to mitigate the interference comprises adjusting a frequency of the intermediate frequency band signal in response to the indication of interference.

26. The method of claim 18, wherein adjusting the intermediate frequency band signal to mitigate the interference is performed based on a performance metric to provide a first level of the performance metric during the interference that differs from a second level of the performance metric occurring in an absence the interference.

27. The method of claim 18, wherein the characteristic of the intermediate frequency band signal is adjusted based on a trade-off between a first performance metric and a second performance metric in response to the indication of interference.

28. The method of claim 27, wherein the first performance metric comprises a value representative of intermediate frequency millimeter wave performance and the second performance metric comprises a value representative of de-sense avoidance.

29. An apparatus for wireless communication, the apparatus comprising:
  means for communicating signals using a first frequency band;
  means for generating an intermediate frequency band signal, the intermediate frequency band overlapping with the first frequency band;
  means for conducting the intermediate frequency band signal internally within the apparatus;
  means for detecting an indication of interference with the means for communicating signals using a first frequency band caused by the means for conducting the intermediate frequency band signal; and
  means, operative in response to the indication of interference, for adjusting the intermediate frequency band signal to mitigate the interference.

30. A non-transitory machine-readable storage medium, the machine-readable storage medium having one or more instructions which when executed by a processing circuit of a user equipment (UE) causes the processing circuit to:
  communicate signals to an external device using a first frequency band;
  generate an intermediate frequency band signal, the intermediate frequency band overlapping with the first frequency band;
  conduct the intermediate frequency band signal internally within the UE;
  detect an indication of interference with the signals communicated using the first frequency band caused by the intermediate frequency band signals; and
  in response to the indication of interference, adjust the intermediate frequency band signal to mitigate the interference.

* * * * *